(12) United States Patent
Hafner et al.

(10) Patent No.: US 8,531,162 B2
(45) Date of Patent: Sep. 10, 2013

(54) NETWORK BASED ENERGY PREFERENCE SERVICE FOR MANAGING ELECTRIC VEHICLE CHARGING PREFERENCES

(75) Inventors: James Lee Hafner, San Jose, CA (US); Melissa Wiltsey O'Mara, Tully, NY (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 12/139,564

(22) Filed: Jun. 16, 2008

(65) Prior Publication Data

US 2009/0313098 A1 Dec. 17, 2009

(51) Int. Cl.
| | |
|---|---|
| *H02J 7/00* | (2006.01) |
| *G06Q 30/00* | (2006.01) |
| *G06Q 30/02* | (2006.01) |
| *G06Q 99/00* | (2006.01) |
| *G06Q 20/00* | (2006.01) |
| *H04L 9/00* | (2006.01) |

(52) U.S. Cl.
USPC ........ 320/137; 705/7.29; 705/7.35; 705/14.1; 705/14.13; 705/14.14; 705/63; 705/72; 705/412

(58) Field of Classification Search
USPC ............ 320/128, 137; 705/7.29, 7.35, 14.62, 705/50–51, 62–63, 72, 14.1, 14.13, 14.14, 705/35, 39
See application file for complete search history.

(56) References Cited

U.S. PATENT DOCUMENTS

| | | |
|---|---|---|
| 3,867,682 A | 2/1975 | Yamauchi et al. |
| 4,306,156 A | 12/1981 | Monaco et al. |
| 4,351,405 A | 9/1982 | Fields et al. |
| 4,389,608 A | 6/1983 | Dahl et al. |
| 4,433,278 A | 2/1984 | Lowndes et al. |
| 4,532,418 A | 7/1985 | Meese et al. |
| 5,049,802 A | 9/1991 | Mintus et al. |

(Continued)

FOREIGN PATENT DOCUMENTS

| | | |
|---|---|---|
| AU | 2003208173 | 9/2003 |
| JP | 2000279519 | 10/2000 |

(Continued)

OTHER PUBLICATIONS

USPTO Non-final office action dated Oct. 6, 2010 regarding U.S. Appl. No. 12/139,561.

(Continued)

*Primary Examiner* — Bot Ledynh
(74) *Attorney, Agent, or Firm* — Yee & Associates, P.C.; David A. Mims, Jr.

(57) ABSTRACT

A computer implemented method, apparatus, and computer usable program product is provided for managing network based preferences associated with charging transactions for electric vehicles. The network based energy preference service receives an identification of a principal associated with a first computing device using a network connection. The network based energy preference service receives a selection of preferences from the principal associated with the first computing device over the network connection to form a set of preferences for the principal. In response to receiving a request for a subset of preferences from the set of preferences for the principal from a preference requesting service, the network based energy preference service retrieves the subset of preferences from the set of preferences by the network based energy preference service and sends the subset of preferences to the preference requesting service.

17 Claims, 10 Drawing Sheets

(56) References Cited

U.S. PATENT DOCUMENTS

| | | |
|---|---|---|
| 5,184,058 A | 2/1993 | Hesse et al. |
| 5,343,970 A | 9/1994 | Severinsky |
| 5,359,228 A | 10/1994 | Yoshida |
| 5,422,624 A | 6/1995 | Smith |
| 5,441,122 A | 8/1995 | Yoshida |
| 5,487,002 A | 1/1996 | Diller et al. |
| 5,492,189 A | 2/1996 | Kriegler et al. |
| 5,492,190 A | 2/1996 | Yoshida |
| 5,548,200 A | 8/1996 | Nor et al. |
| 5,563,491 A | 10/1996 | Tseng |
| 5,566,774 A | 10/1996 | Yoshida |
| 5,594,318 A | 1/1997 | Nor et al. |
| 5,627,752 A | 5/1997 | Buck et al. |
| 5,642,270 A | 6/1997 | Green et al. |
| 5,675,205 A | 10/1997 | Jacob et al. |
| 5,736,833 A | 4/1998 | Farris |
| 5,778,326 A | 7/1998 | Moroto et al. |
| 6,067,008 A | 5/2000 | Smith |
| 6,081,205 A | 6/2000 | Williams |
| 6,225,776 B1 | 5/2001 | Chai |
| 6,234,932 B1 | 5/2001 | Kuroda et al. |
| 6,252,380 B1 | 6/2001 | Koenck |
| 6,278,915 B1 | 8/2001 | Deguchi et al. |
| 6,285,931 B1 | 9/2001 | Hattori et al. |
| 6,301,531 B1 | 10/2001 | Pierro et al. |
| 6,307,349 B1 | 10/2001 | Koenck et al. |
| 6,373,380 B1 | 4/2002 | Robertson et al. |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi et al. |
| 6,487,477 B1 | 11/2002 | Woestman et al. |
| 6,586,866 B1 | 7/2003 | Ikedo et al. |
| 6,609,582 B1 | 8/2003 | Botti et al. |
| 6,614,204 B2 | 9/2003 | Pellegrino et al. |
| 6,629,024 B2 | 9/2003 | Tabata et al. |
| 6,727,809 B1 | 4/2004 | Smith |
| 6,741,036 B1 | 5/2004 | Ikedo et al. |
| 6,766,949 B2 | 7/2004 | Terranova et al. |
| 6,789,733 B2 | 9/2004 | Terranova et al. |
| 6,794,849 B2 | 9/2004 | Mori et al. |
| 6,850,898 B1 | 2/2005 | Murakami et al. |
| 6,909,200 B2 | 6/2005 | Bouchon |
| 6,915,869 B2 | 7/2005 | Botti et al. |
| 7,013,205 B1 | 3/2006 | Hafner et al. |
| 7,039,389 B2 | 5/2006 | Johnson, Jr. |
| 7,049,720 B2 | 5/2006 | Darday |
| 7,178,616 B2 | 2/2007 | Botti et al. |
| 7,216,729 B2 | 5/2007 | Syed et al. |
| 7,243,010 B2 | 7/2007 | Tabata et al. |
| 7,309,966 B2 | 12/2007 | Wobben |
| 7,402,978 B2 | 7/2008 | Pryor |
| 7,565,396 B2 | 7/2009 | Hoshina |
| 7,674,536 B2 | 3/2010 | Chipchase et al. |
| 7,693,609 B2 | 4/2010 | Kressner et al. |
| 7,698,078 B2 | 4/2010 | Kelty et al. |
| 7,740,092 B2 | 6/2010 | Bender |
| 7,885,893 B2 | 2/2011 | Alexander |
| 7,949,435 B2 | 5/2011 | Pollack et al. |
| 7,956,570 B2 | 6/2011 | Lowenthal et al. |
| 7,991,665 B2 | 8/2011 | Hafner et al. |
| 8,054,048 B2 | 11/2011 | Woody et al. |
| 8,103,386 B2 | 1/2012 | Ichikawa et al. |
| 8,103,391 B2 | 1/2012 | Ferro et al. |
| 2002/0064258 A1 | 5/2002 | Schelberg, Jr. et al. |
| 2002/0153726 A1 | 10/2002 | Sumner |
| 2003/0137277 A1 | 7/2003 | Mori et al. |
| 2003/0153278 A1 | 8/2003 | Johnson, Jr. |
| 2003/0205619 A1 | 11/2003 | Terranova et al. |
| 2004/0046506 A1 | 3/2004 | Kawai et al. |
| 2004/0062059 A1 | 4/2004 | Cheng et al. |
| 2004/0265671 A1 | 12/2004 | Chipchase et al. |
| 2005/0008904 A1 | 1/2005 | Suppes |
| 2005/0044245 A1 | 2/2005 | Hoshina |
| 2005/0231119 A1 | 10/2005 | Ito et al. |
| 2006/0182241 A1 | 8/2006 | Schelberg, Jr. et al. |
| 2006/0282381 A1 | 12/2006 | Ritchie |
| 2006/0287783 A1 | 12/2006 | Walker |
| 2007/0126395 A1 | 6/2007 | Suchar |
| 2007/0282495 A1 | 12/2007 | Kempton et al. |
| 2008/0039979 A1 | 2/2008 | Bridges et al. |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek et al. |
| 2008/0155008 A1 | 6/2008 | Stiles et al. |
| 2008/0180027 A1 | 7/2008 | Matsushita et al. |
| 2008/0228613 A1 | 9/2008 | Alexander |
| 2008/0281663 A1 | 11/2008 | Hakim et al. |
| 2008/0312782 A1 | 12/2008 | Berdichevsky et al. |
| 2009/0021213 A1 | 1/2009 | Johnson |
| 2009/0030712 A1 | 1/2009 | Bogolea et al. |
| 2009/0043519 A1 | 2/2009 | Bridges et al. |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean et al. |
| 2009/0144001 A1 | 6/2009 | Leonard et al. |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek et al. |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313103 A1 | 12/2009 | Ambrosio et al. |
| 2009/0313104 A1 | 12/2009 | Hafner et al. |
| 2009/0313174 A1 | 12/2009 | Hafner et al. |
| 2010/0017045 A1 | 1/2010 | Nesler et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0169008 A1 | 7/2010 | Niwa et al. |
| 2011/0071923 A1* | 3/2011 | Kende et al. ............... 705/26.61 |

FOREIGN PATENT DOCUMENTS

| | | |
|---|---|---|
| JP | 2000289355 | 10/2000 |
| JP | 2001359203 A | 12/2001 |
| JP | 2006262570 A | 9/2006 |
| WO | WO2003075440 | 9/2003 |
| WO | WO2006057889 | 6/2006 |

OTHER PUBLICATIONS

USPTO Non-final office action dated Jan. 7, 2011 regarding U.S. Appl. No. 12/139,561.

USPTO Non-final office action dated Jul. 11, 2011 regarding U.S. Appl. No. 12/139,561.

USPTO Non-final office action dated Jun. 20, 2011 regarding U.S. Appl. No. 12/194,325.

USPTO Final office action dated Nov. 29, 2010 regarding U.S. Appl. No. 12/194,290.

U.S. Appl. No. 12/139,562, filed Jun. 16, 2008, Hafner et al.
U.S. Appl. No. 12/139,561, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,575, filed Jun. 16, 2008, Hafner et al.
USPTO office action for U.S. Appl. No. 12/194,290 dated Jun. 4, 2010.

USPTO office action for U.S. Appl. No. 12/139,575 dated Oct. 8, 2010.
USPTO office action for U.S. Appl. No. 12/194,210 dated Nov. 22, 2010.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.
USPTO notice of allowance for U.S. Appl. No. 12/139,575 dated Mar. 8, 2011.
Office Action, dated Mar. 1, 2012, regarding U.S. Appl. No. 12/139,562, 8 pages.
Notice of Allowance, dated Apr. 30, 2012, regarding U.S. Appl. No. 12/139,574, 17 pages.
Final Office Action, dated May 11, 2012, regarding U.S. Appl. No. 12/194,245, 32 pages.
USPTO Office Action dated Feb. 2, 2012, regarding U.S. Appl. No. 12/139,561, 12 pages.
USPTO Office Action dated Oct. 3, 2011, regarding U.S. Appl. No. 12/139,562, 65 pages.
USPTO Final Office Action dated Feb. 7, 2012, regarding U.S. Appl. No. 12/139,562, 47 pages.
USPTO Final Office Action dated Oct. 26, 2011, regarding U.S. Appl. No. 12/139,565, 27 pages.
USPTO Final Office Action dated Oct. 19, 2011, regarding U.S. Appl. No. 12/139,569, 35 pages.
USPTO Final Office Action dated Oct. 14, 2011, regarding U.S. Appl. No. 12/139,571, 36 pages.
USPTO Notice of Allowance dated Jan. 19, 2012, regarding U.S. Appl. No. 12/139,574, 38 pages.
Appeal Brief dated Aug. 24, 2011, regarding U.S. Appl. No. 12/194,210, 35 pages.
USPTO Examiner's Answer dated Nov. 2, 2011, regarding U.S. Appl. No. 12/194,210, 21 pages.
Reply Brief dated Dec. 21, 2011, regarding U.S. Appl. No. 12/194,210, 15 pages.
USPTO Office Action dated Nov. 18, 2011, regarding U.S. Appl. No. 12/194,245, 40 pages.
Appeal Brief dated May 2, 2011, regarding U.S. Appl. No. 12/194,290, 57 pages.
USPTO Examiner's Answer dated Jul. 6, 2011, regarding U.S. Appl. No. 12/194,290, 24 pages.
Reply Brief dated Sep. 6, 2011, regarding U.S. Appl. No. 12/194,290, 9 pages.
USPTO Notice of Allowance dated Sep. 14, 2011, regarding U.S. Appl. No. 12/194,325, 7 pages.
USPTO Final Office Action dated Oct. 17, 2011, regarding U.S. Appl. No. 12/194,341, 15 pages.
Hafner et al., U.S. Appl. No. 13/430,864, filed Mar. 27, 2012, 55 pages.
Ambrosio et al., U.S. Appl. No. 13/431,539, filed Mar. 27, 2012, 66 pages.
Non-final office action dated May 26, 2010 regarding U.S. Appl. No. 12/048,183, 14 pages.
Notice of allowance dated Dec. 10, 2010 regarding U.S. Appl. No. 12/048,183, 10 pages.
Non-final office action dated Aug. 16, 2005 regarding U.S. Appl. No. 10/992,840, 9 pages.
Notice of allowance dated Dec. 1, 2005 regarding U.S. Appl. No. 10/992,840, 8 pages.
International search report dated Jan. 3, 2007 regarding application PCT/US2005/041688, 1 page.
Boujelelben et al., "Evaluation and optimization of a hybrid urban Microbus," IEEE Conference on Electric and Hybrid Vehicles, Dec. 2006, pp. 1-8.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Gonder et al., "Energy Management Strategies for Plug-In Hybrid Electric Vehicles," 2007 SAE World Congress, Apr. 2007, 13 pages.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV," 22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, pp. 83-93.
Short et al., "A Preliminary Assessment of Plug-In Hybrid Electric Vehicles On Wind Energy Markets," Technical Report NREL/TP-620-39729, National Renewable Energy Laboratory, Apr. 2006, 41 pages.
Zhonghao et al., "Research on Modeling and Simulation of Hybrid Electric Vehicle Energy Control Systems,"Proceedings of the Eighth International Conference on Electrical Machines and Systems, vol. 1, Sep. 2005, 4 pages.
Non-final office action dated Aug. 17, 2012 regarding U.S. Appl. No. 13/431,539, 17 pages.
Ackerman, "Hybrid Vehicle Cruises for Battle," Signal Magazine, Apr. 2004, 4 pages, accessed Jan. 9, 2013 http://www.afcea.org/content/?q=node/91.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.13research.com/vehicles/enigma/specifications.htm.
Suppes, "Plug-in Hybrid with Fuel Cell Battery Charger," International Journal of Hydrogen Energy, vol. 30, Issue 2, Feb. 2005, pp. 113-121.
Powers, "Phev," About, Inc., copyright 2005, New York Times Company, 1 pages., accessed Jan. 9, 2013 http://web.archive.org/web/20051231074047/http://hybridcars.about.com.
"Plug-In Hybrids," hybridcars.com, copyright 2005, 2 pages, accessed Jan. 9, 2013 http://web.archive.org/web/20050310125208/http://www.hybridcars.com.
"All About Plug-In Hybrids (PHEVs)," CalCars, California Car Initiative, Copyright 2012, 4 pages, accessed Jan. 9, 2013 http://www.calcars.orgivehicles.html.
Galdi et al., "Multi-Objective Optimization for Fuel Economy and Emissions of HEV Using the Goal-Attainment Method," EVA 18, published 2001, 12 pages.
Final office action dated Jan. 16, 2013 regarding U.S. Appl. No. 13/431,539, 11 pages.
USPTO Notice of Allowance, U.S. Appl. No. 12/139,561, Mar. 14, 2013, 5 pages.

* cited by examiner

NETWORK BASED ENERGY PREFERENCE SERVICE FOR MANAGING ELECTRIC VEHICLE CHARGING PREFERENCES

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for inputting, storing, and maintaining electric vehicle charging preferences on a network based energy preference service.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, bio-diesel powered engines, solar powered generators and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment of the present invention, a computer implemented method, apparatus, and computer usable program product is provided for managing network based preferences associated with charging transactions for electric vehicles. The network based energy preference service receives an identification of a principal associated with a first computing device using a network connection between the first computing device and an energy preference server associated with the network based energy preference service. The principal is an entity having an interest in an electric vehicle charging transaction. The charging transaction is a transaction associated with at least one of charging an electric vehicle, storing electric power in an electric storage mechanism associated with the electric vehicle, and de-charging the electric vehicle. The network based energy preference service receives a selection of preferences from the principal associated with the first computing device over the network connection to form a set of preferences for the principal. A preference in the set of preferences specifies a parameter of the charging transaction that is to be minimized, maximized, or optimized. The preferences in the set of preferences are stored in a data storage device associated with the energy preference server. In response to receiving a request for a subset of preferences from the set of preferences for the principal from a preference requesting service, the network based energy preference service retrieves the subset of preferences from the set of preferences by the network based energy preference service and sends the subset of preferences to the preference requesting service.

DETAILED DESCRIPTION OF THE INVENTION

Figure 1:
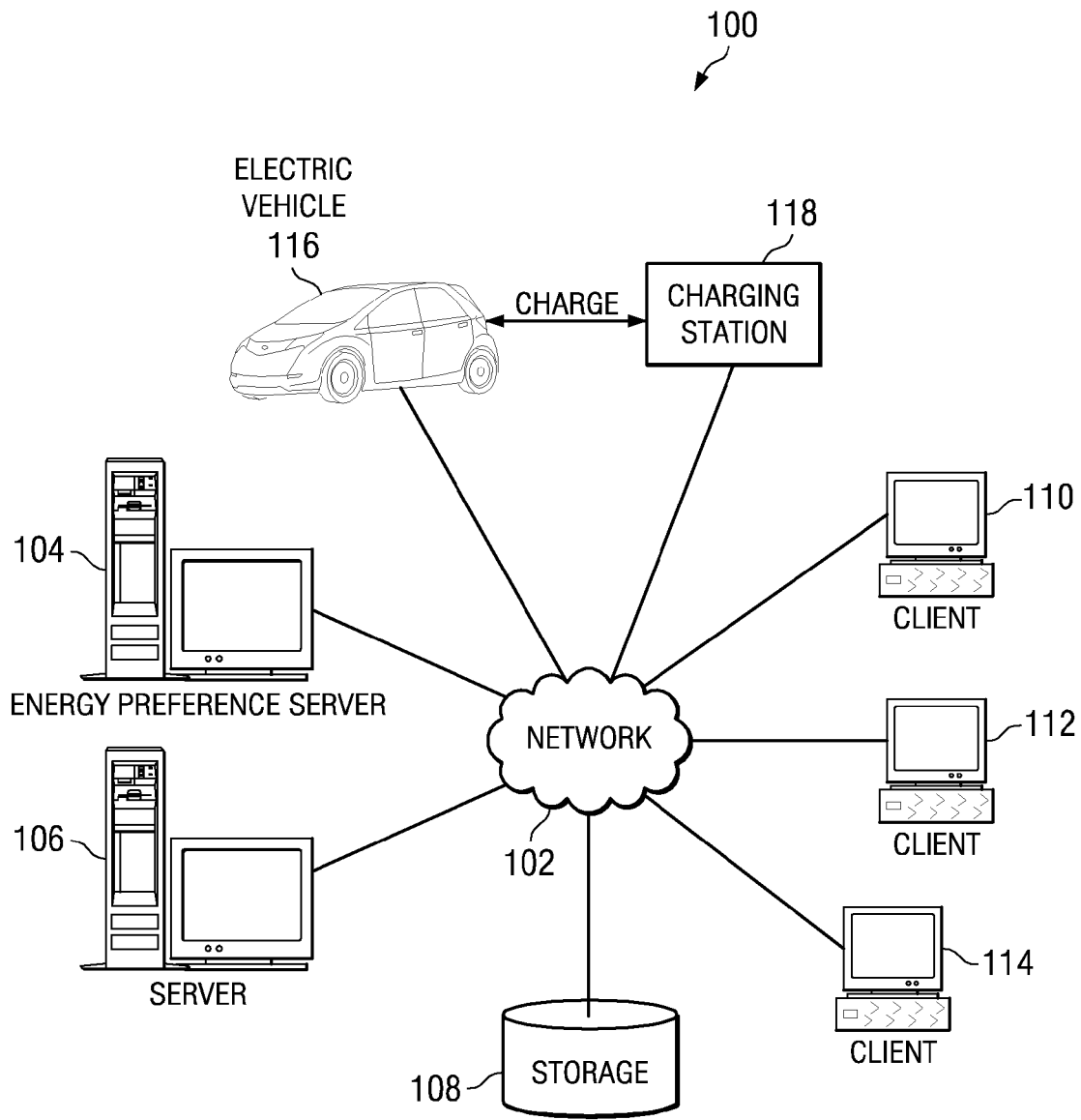
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
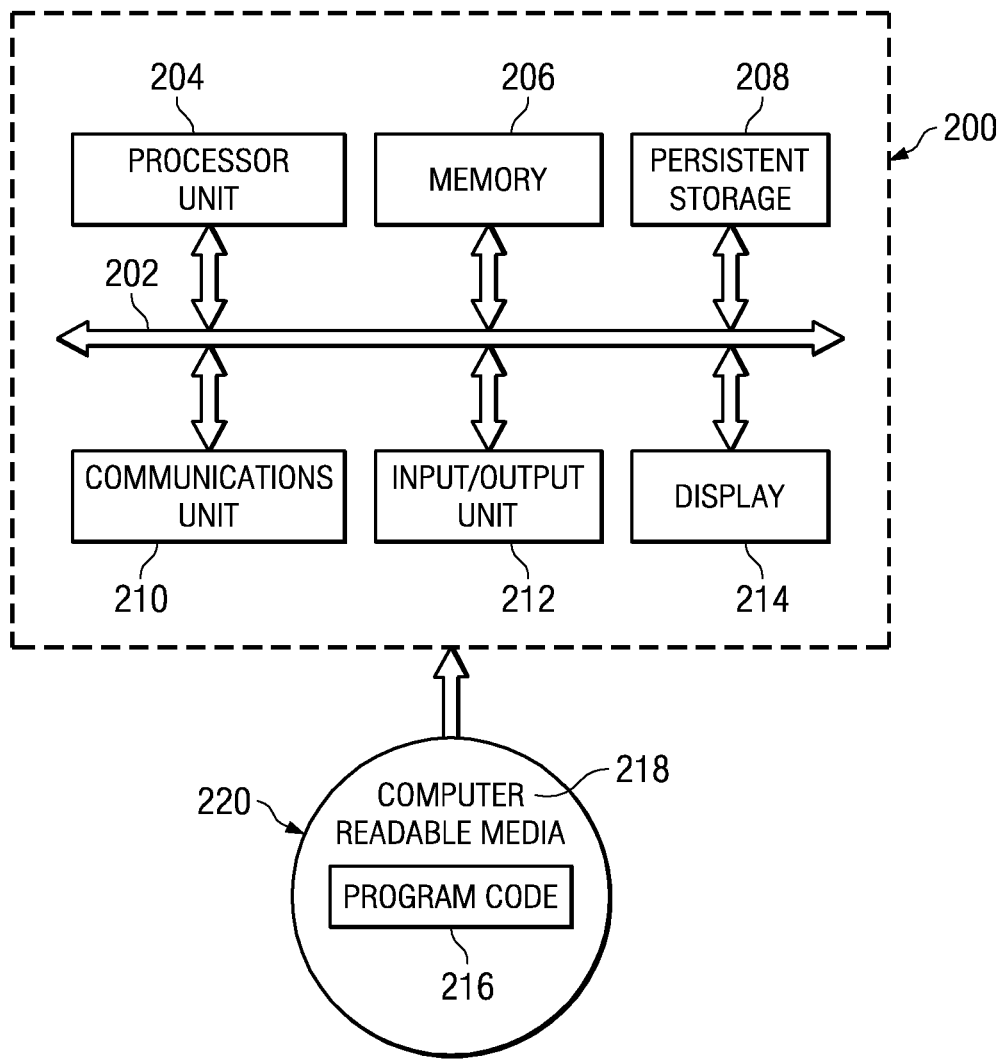
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a bio-diesel/electric hybrid, or any other type of plug-in electric hybrid. Electric vehicle 116 may optionally include an on-vehicle power generation mechanism such as, but without limitation, solar power electric generators, gasoline powered electric generators, bio-diesel powered electric generators, regenerative breaking systems, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. In other words, electric charge may flow from an electric grid through charging station 118 to electric vehicle 116 or the electric charge may flow from electric vehicle 116 back into the electric grid through charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, all parties are presented with the conditions governing the charging transaction. Electricity flows to the electric vehicle during the charge phase. Finally, during the post-charge phase of the transaction, payment is made and an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
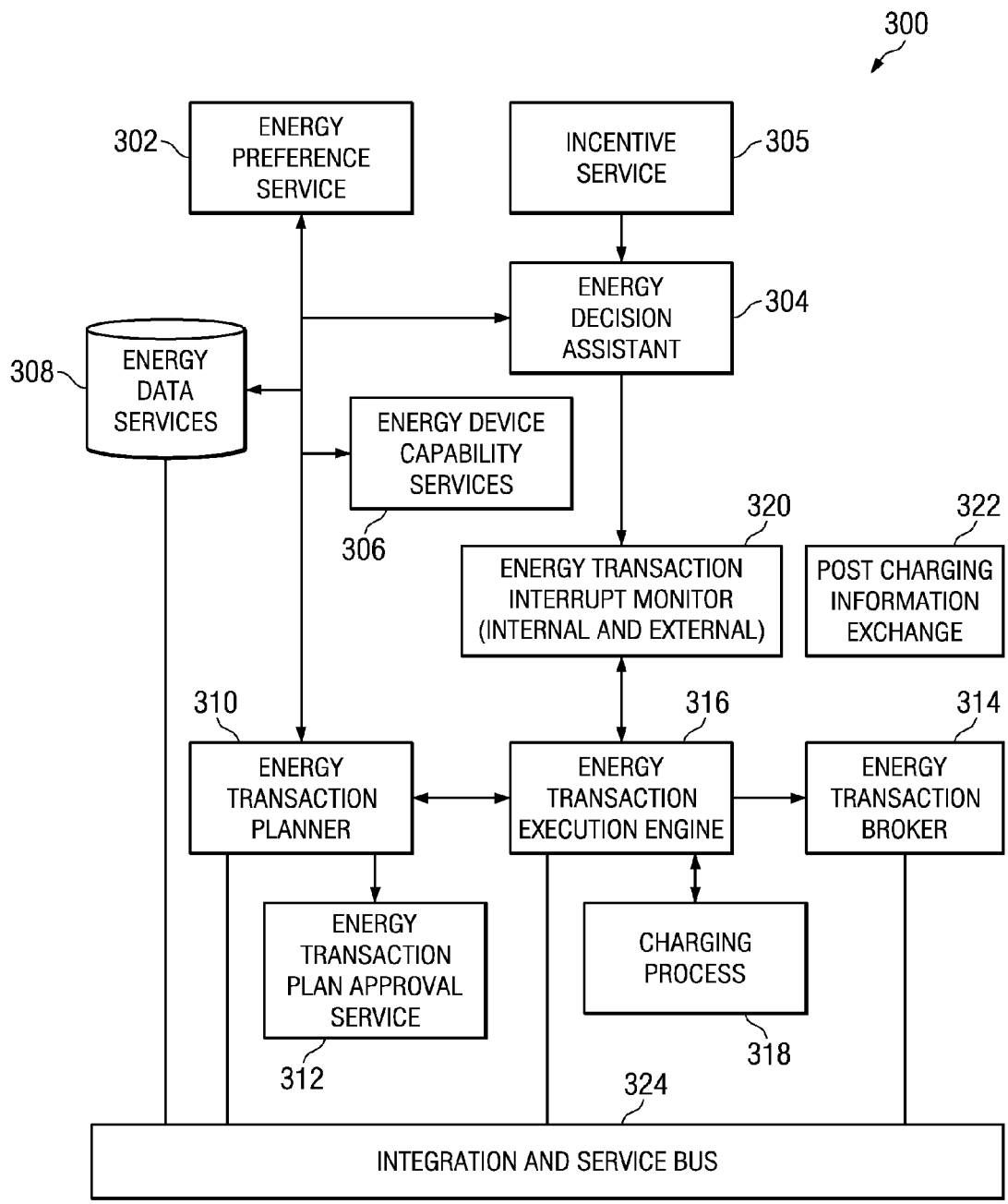
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions which are presented in standard formats which are universally understood and which can be readily communicated and agreed upon by all parties.

During the pre-charge phase, electric vehicle energy transaction infrastructure 300 may utilize energy preference service 302, energy decision assistant 304, incentive service 305, energy device capability services 306, energy data services 308, energy transaction planner 310, and/or energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 305 provides information describing current incentives to energy transaction planner 310. In one embodiment, incentives service 305 provides the information describing the incentives to energy decision assistant 304. Energy decision assistant 304 then provides the incentives information to energy transaction planner 310.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction.

In this example, the charging phase begins when energy transaction execution engine 316 sends the transaction plan generated by energy transaction planner 310 for approval by energy transaction plan approval service 312, initiates the request to begin charging the electric vehicle, monitors and logs the health and safety of charging process 318, and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

During this charging phase, payment or fees for the charge are also recorded. Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

The process of inputting preferences into energy preference service 302 may be quite complex and require sophisticated user interface that may not be economically feasible to instantiate on all devices that may contain a preference service. For example, a vehicle preference service located on an electric vehicle may have limited input/output components. The illustrative embodiments recognize that input/output devices available on an electric vehicle may not allow for complex input from a user. The embodiments recognize that there is a need for a system that allows for complex input processes for the principal to create electric vehicle charging preferences using a energy preference service that is located off the electric vehicle in a remote computing device that is accessible to an energy transaction planner via a network connection.

The embodiments also recognize a need to enable an entity, such as an electric company, vehicle manufacturer, credit card company, or other third party to the charging transaction, to be able to provide an energy preference service for a group of principals. The principals may be electric utility clients, vehicle owners, credit card users, or other groups. The vehicle owners may be customers of a service, such as an on-board navigation system, internet provider services, cellular telephone services, road-side service, vehicle security, or other services. An example of a service provider includes, without limitation, service providers such as OnStar®.

According to one embodiment of the present invention, a computer implemented method, apparatus, and computer usable program product is provided for managing network based preferences associated with charging transactions for electric vehicles. The network based energy preference service receives an identification of a principal associated with a first computing device using a network connection between the first computing device and an energy preference server associated with the network based energy preference service. The principal is an entity having an interest in an electric vehicle charging transaction.

The charging transaction is a transaction associated with at least one of charging the electric vehicle, storing electric power in an electric storage mechanism associated with the electric vehicle, and de-charging the electric vehicle. As used herein the phrase "at least one of" when used with a list of items means that different combinations of one or more of the items may be used and only one of each item in the list is needed. For example, at least one of a charging the electric vehicle, storing electric power in an electric storage mechanism, and de-charging the electric vehicle may include, for example and without limitation, only charging the electric vehicle or a combination of charging the electric vehicle and storing electric power in an electric storage mechanism associated with the electric vehicle. This example also may include a transaction that involves any combination of charging the electric vehicle, storing electric power in an electric storage mechanism associated with the electric vehicle, and de-charging the electric vehicle. In addition, the charging, storing, and de-charging may occur more than one time during a given charging transaction. For example, during a single transaction, the electric vehicle may be de-charged, then charged, used to store electric power in the electric storage mechanism for a given time, then de-charged for a second time, and after a given time period, the electric vehicle may be re-charged again. All these occurrences of charging, storing, and de-charging may occur in a single charging transaction or in a series of two or more charging transactions.

The network based energy preference service receives a selection of preferences from the principal associated with the first computing device over the network connection to form a set of preferences for the principal. A set of preferences may include a single preference, as well as two or more preferences. A preference in the set of preferences specifies a parameter of the charging transaction that is to be minimized, maximized, or optimized. A parameter of the charging transaction is any feature of the charging transaction, such as, without limitation, a rate of charging, a length of time for charging, a time to begin charging, a time to cease charging, a maximum level of charge, a minimum level of charge, or any other aspect of the charging transaction.

It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized state.

The preferences in the set of preferences are stored in a data storage device associated with the energy preference server. In other words, the set of preferences are transmitted from the first computing device wherein the principal selects the preferences over the network connection to the network based energy preference service located on the energy preference server.

The network based energy preference service receives a request for a subset of preferences from the set of preferences for the principal from a preference requesting service. The preference requesting service may be located on the electric vehicle, on the first computing device, on the energy preference server, or on a different remote computing device. The preference requesting service may be an energy transaction planner, a proxy preference service located on the electric vehicle, or any other requesting entity. The network based energy preference service retrieves the subset of preferences and sends the subset of preferences to the preference requesting service.

In another embodiment, the network based energy transaction service receives the request from another preference requesting service, such as, without limitation, a proxy preference service located on the electric vehicle or a proxy preference service located on a different remote computing device. In such a case, the network based energy preference service retrieves the subset of preferences for the principal and sends the subset of preferences to the proxy preference service. The proxy preference service then sends the subset of preferences to the preference requesting service. In this example, the network based energy preference service does not receive any direct communications from the preference requesting service. Instead, the proxy preference service acts as an intermediary between the network based preference service and the preference requesting service.

Figure 4:
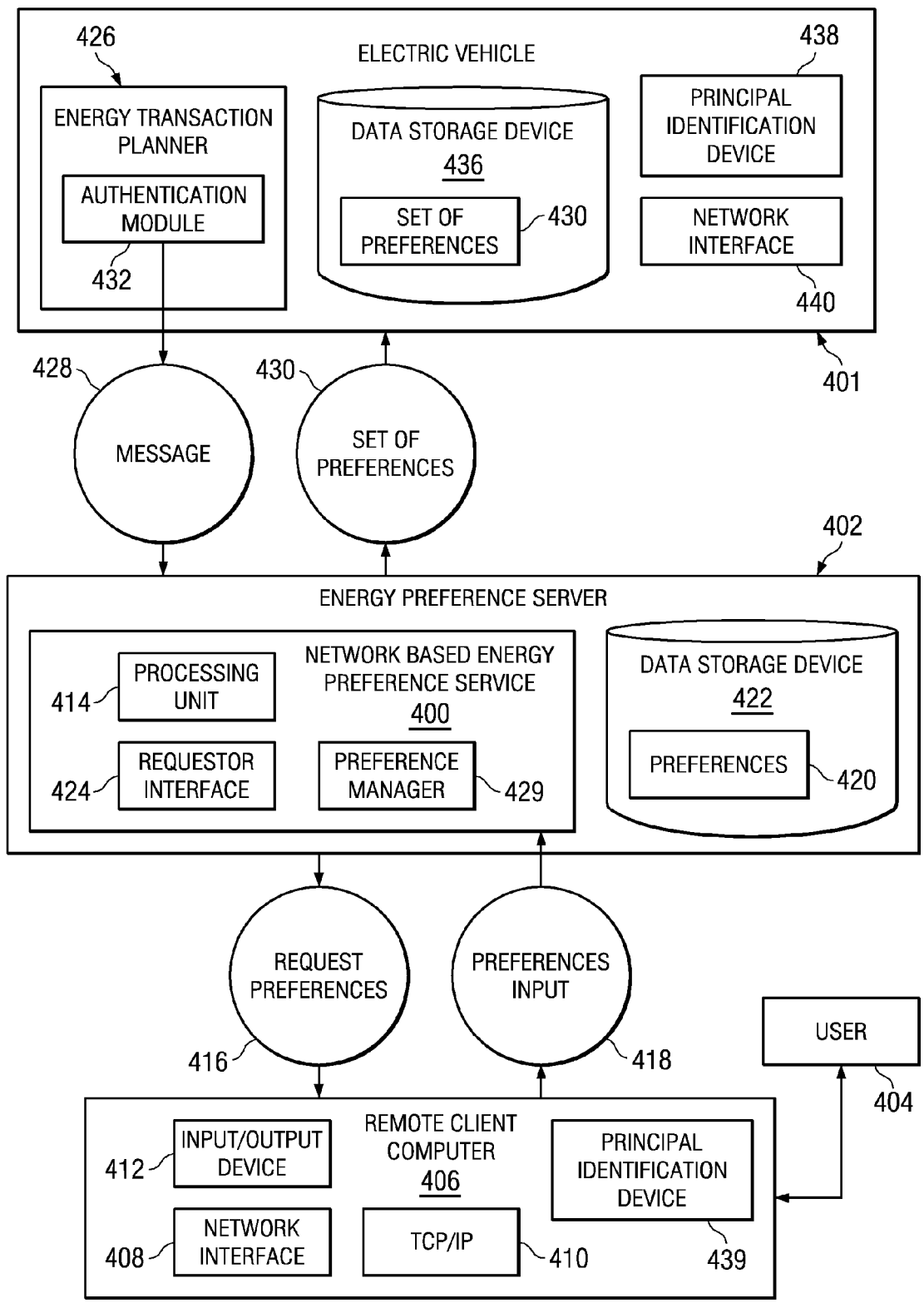
FIG. 4 is a block diagram of a network based energy preference service in accordance with an illustrative embodiment.

FIG. 4 is a block diagram of a network based energy preference service in accordance with an illustrative embodiment. Network based energy preference service 400 is a software application for creating, managing, storing, and retrieving electric vehicle charging preferences for utilization in creating an energy transaction plan for electric vehicle 401, such as energy preference service 302 in FIG. 3. A principal uses network based energy preference service 400 to maintain, input, store, and/or retrieve electric vehicle charging preferences for the principal and/or one or more other principals associated with the electric vehicle charging transaction, such as, without limitation, an electric utility of the owner, an electric utility of the operator, the charging station, the electric vehicle manufacturer, the electric vehicle distributor, or any other party with an interest in the charging transaction for electric vehicle 401. Electric vehicle 401 is an electric vehicle that relies in whole or in part on electricity to drive the vehicle, such as, without limitation, electric vehicle 116 in FIG. 1.

Network based energy preference service 400 is located on energy preference server 402. Energy preference server 402 is a server for providing application services to users on a network, such as network 102 in FIG. 1. Energy preference server 402 is a remote computing device for hosting software applications and/or services provided by network based energy preference service 400. User 404 obtains the services provided by network based energy preference services by connecting to energy preference service 402 from remote client computer 406. Energy preference server 402 may be, without limitation, an application server, a web services server, or any other host computing device for providing software as a service to users.

Network based energy preference service 400 may be accessed via a website on a web server. The website may be provided by any principal, such as, without limitation, a utility company on behalf of its customers, an energy transaction broker, a personal website of the principal, or a personal website of an associate or agent of the principal, such as a family member or employee of the principal.

The registration of the principal at the website associated with network based energy preferences service 400 may require a registration process, such as by entering a user name, password, or other identifying information. The principal may be required to agree that a particular party provide the preferences service via the website. The principal may be required to pay a fee for utilization of network based energy preferences service 400.

Remote client computer 406 may be implemented as any type of computing device, such as, without limitation, a desktop computer, a laptop computer, a personal digital assistant (PDA), a cellular telephone, or any other type of computing device shown in FIGS. 1 and 2. A personal digital assistant is any type of mobile computing device, such as, for example and without limitation, a blackberry or an iphone™.

Remote client computer 406 comprises network interface 408, TCP/IP 410, and input/output device 412. Network interface 408 is any type of network access software known or available for allowing remote client computer 406 to communicate with energy preference server 402 over a network, such as network 102 in FIG. 1. The network connection permits access to any type of network, such as a local area network (LAN), a wide area network (WAN), or the Internet. Remote client computer 406 utilizes network interface 408 to send and receive messages and/or data packets over the network. Network interface 408 may send and receive messages in accordance with a protocol, such as, without limitation, a transmission control protocol and internet protocol (TCP/IP) 410 or any other protocol for enabling transmission of data across a network. User input/output 412 may be implemented in any type of user interface for receiving input from user 404 and providing output to user 404, such as, without limitation, a graphical user interface, a command line interface, a menu driven interface, a keyboard, a mouse, a touch screen, a voice-recognition system, or any other type of input/output device.

Network based energy preference service 400 comprises processing unit 414. Processing unit 414 provides the overall coordination of the components associated with network based energy preference service 400. When user 404 logs onto network based energy preference service 400, network based energy preference service 400 makes a determination as to whether user 404 has already selected preferences.

Network based energy preference service 400 requests an identity of user 404 from user 404. If the identity of user 404 indicates that user 404 is a new user, network based preference service 400 creates a template for electric vehicle charging preferences for user 404. Network based energy preference service 400 sends request 416 to user 404 at remote client computer 406 to prompt user 404 to select preferences for charging electric vehicle 401. Requests 416 are sent to user 404 through user input/output 412. User 404 enters preference choices as input through user input/output 412.

Remote client computer 406 sends the preference selections chosen by user 404 as preferences input 418 to network based energy preference service 400 on energy preference server 402. Network based energy preference service 400 stores the preference choices selected by user 404 as preferences 420 in data storage device 422. Preferences 420 may include preferences for a single principal, as well as preferences for two or more principals.

In one embodiment, if user 404 is not a new user, and pre-existing preferences are stored for user 404, network based energy preference service 402 transmits the pre-existing preferences to remote client computer 406 for display to user 404. Remote client computer 406 displays the pre-existing preferences to user 404 via input/output device 412 and gives user 404 an opportunity to update or change one or more of the preferences that user 404 previously selected. The updated or modified preferences are then sent back to network based energy preference service 400 as preferences input 418.

The process of inputting and editing preferences may be implemented via a website hosted by energy preference server 402, a computer application that provides a user interface, such as user input/output device 412, and which then transmits the preferences to network based preference service 400, or even by paper questionnaire that is then scanned or manually entered into network based energy preference service 400.

Preferences 420 are choices for managing, governing, and controlling the manner in which electric vehicle 401 is charged at a charging station, such as charging station 118 in FIG. 1. A preference specifies a parameter of the charging transaction that is to be minimized, maximized, or optimized. Each preference may optionally be associated with a weighting value. For example, a preference may specify that charging at charging stations that obtain power from environmentally friendly, "green", wind farms is to be maximized while charging at charging stations that obtain power from "brown", coal powered plants that may be harmful to the environment and should be minimized. Brown energy refers to power generated from polluting sources, as opposed to green energy that is produced from renewable or less polluting energy sources.

Preferences 420 may also specify the price per kilowatt hour the user is willing to pay to charge the electric vehicle, identify certain charging stations the user prefers to fully charge electric vehicle 401 and identify other charging stations at which the user prefers to partially charge electric vehicle 401, perhaps due to proximity to the user's home or due to the source of the electricity used by the charging station. For example, preferences may indicate that charging when the price per kilowatt hour is less than thirteen cents is to be maximized and charging when prices are higher than thirteen cents per kilowatt hour is to be minimized or prohibited all together. In another example, preferences 420 may specify a limit, such as, without limitation, to buy electricity up to a certain price or optimize the cost of the return trip home given the current prices of gas and electricity.

Preferences 420 may be static, dynamic, or temporary preferences. A static preference is a preference that is effective until the user changes the preference. A static preference may be referred to as a default preference. A dynamic preference is a preference that does not have a predetermined value. A dynamic preference requires a user to enter a value for the dynamic preference in real time. Thus, if a preference is a dynamic preference, the principal is always prompted to enter a preference value indicating whether a particular operator of electric vehicle 401 is authorized to charge the electric vehicle. A user may choose to make a preference for operator charging electric vehicle 401 a dynamic preference so that the owner of electric vehicle 401 will always be informed of who is attempting to charge electric vehicle 401 and have the option of preventing the charging of electric vehicle 401 in real time prior to commencing of the charging transaction. A temporary preference is a preference that is only valid for a predetermined period of time. When the period of time expires, the temporary preference is invalid and no longer used. For example, a user may set a temporary preference that indicates no charging is to be performed for the next ten minutes at the charging station where the user is parked because the user is only going to be parked for five minutes. At the end of the ten minute time period, the temporary preference expires and electric vehicle 401 can begin charging if the electric vehicle 401 is still parked at the charging station.

User 404 enters preference selections using input/output device 412. Remote client computer 406 transmits the selected preferences as preferences input 418 to network based energy preference service 400 over a network connection established by network interface 408. Network based energy preference service 400 stores the preferences selected by user 404 as preferences 420 in data storage device 422. Data storage device 422 may be implemented as any type of known or available device for storing data, such as, without limitation, a hard drive, a flash memory, a main memory, read only memory (ROM), a random access memory (RAM), a magnetic or optical disk drive, tape, or any other type of data storage device. Data storage device 422 may be a persistent storage device, such as a disk drive, or a database. A database may be a replicated database, a distributed database, a relational database, or any other type of database.

Data storage may be implemented in a single data storage device or a plurality of data storage devices. In this embodiment, data storage device 422 is located locally on energy preference server 402. However, data storage device 422 may also be located remotely to energy preference server 402. Data storage device 422 may be implemented as a single data storage device or as two or more physical data storage devices working in conjunction. For example, data storage device 422 may be one or more data storage devices associated with a computer cluster or a grid computing system.

Network based energy preference service 400 receives requests from energy transaction planner 426 and responds to the requests from energy transaction planner 426 through requester interface 424. Requestor interface 424 provides the necessary communication protocols and mechanisms to permit network based energy preference service 400 to communicate with an entity requesting preferences, such as, without limitation, energy transaction planner 426 or a proxy preference service.

Energy transaction planner 426 is a component for generating an energy transaction plan to manage the charging of electric vehicle 401 connected to an electric grid in accordance with the preferences of one or more principals to the electric vehicle charging transaction, such as energy transaction planner 310 in FIG. 3. When energy transaction planner 426 is engaged to create a transaction plan to govern an electric vehicle charging transaction for electric vehicle 401, energy transaction planner 426 sends message 428 through requester interface 424 to network based energy preference service 400.

Message 428 contains at least the identity of one or more principals and a description of the specific preferences that are required by energy transaction planner 426. For example, energy transaction planner 426 may only need preferences that are related directly to charging electric vehicle 401 if the charging station is incapable of providing discharge or store services. Message 428 may be implemented as a single message including the identification of one or more principals and an identification of the types of preferences of interest for the energy transaction or two or more messages exchanged between energy transaction planner 426 and network based energy preference service 400.

Energy transaction planner 426 may include authentication module 432 to establish a secure communication channel. The security of the communication mechanism depends on the specific deployment requirements and may be implemented using known techniques. In this embodiment, energy preferences server 400 and energy transaction planner on a remote computing device performs a cross identification. The cross identification is symmetrical. However, the cross identification may also be asymmetrical if network based energy preference service 400 has a trust relationship with energy transaction planner 426. For example, network based preference service 400 may be an embodiment on a server associated with a trusted third party energy transaction broker.

Authentication module 432 comprises any type of known or available encryption technology and/or security protocols. Authentication module 432 authenticates and/or encrypts communications between network based energy preference service 400 and energy transaction planner 426. Authentication module 432 may be used to authenticate network based energy preference service 400 itself or authenticate tokens provided by network based energy preference service 400 for each of the principals for which network based energy preference service 400 is providing preferences to energy transaction planner 432. Authentication module 432 may also be used to authenticate information received from network based energy preference service 400, such as information received in message 428. The identification for most of these instances could be the principal's name and/or account number together with a PIN. In another example, the identification may be a user ID and password combination. More complex mechanisms, such as public/private key exchanges are also possible if the communication medium supports it. Energy preference server 402 and remote client computer 406 may also optionally include an authentication module for authenticating and/or encrypting communications with entities on the network.

Network based energy preferences service 400 may also include an authentication module (not shown) for providing energy transaction planner 426 with identification, a location, and/or communication channels for network based energy preference service 400 in a secure manner. The identification, location, and/or communication channel may include, without limitation, a uniform resource locator (URL) or a phone number.

In response to receiving message 428, network based energy preference service 400 retrieves one or more preferences from the plurality of preferences stored in preferences 420 in data storage device 422 for the principal identified in message 428. Preference manager 429 is a software component associated with network based energy preference service 400. Preference manager 429 identifies specific preferences in preferences 420 that are responsive to the request received in message 428. Message 428 is received over the network from energy transaction planner 426. Preference manager 428 retrieves the preferences that are responsive to the request for the identified user to form a set of preferences 430. Set of preferences 430 are sent to energy transaction planner 426 over the network for utilization in generating an energy transaction plan. Energy transaction planner 426 may optionally store set of preferences 430 in data storage device 436. Data storage device 436 is located locally to energy transaction planner 426. In this example, data storage device 436 is located on electric vehicle 401. However, energy transaction planner 426 and/or data storage device 436 may optionally be located on a computing device that is remote from electric vehicle 401 and remote from energy preference server 402.

Electric vehicle 401 comprises principal identification device 438. Remote client computer 406 may also include principal identification device 439. Principal identification device 438 is used to identify an operator of electric vehicle 401. Principal identification device 439 may be used to identify user 404 at remote client computer 406. For example, when user 404 creates preferences and/or updates a pre-existing set of preferences, remote client computer 406 uses principal identification device 439 to identify user 404. Remote client computer 406 sends the identification to network based energy preference service 400 so that the preferences created by user 404 may later be retrieved when energy transaction planner 426 requests preferences for that particular user. In other words, principal identification device 439 authenticates users of the preference service who request input/access to their preferences, for example, and without limitation, to initiate a planning phase. Principal identification device 438 is used to verify the identity of an operator of electric vehicle 401.

Principal identification device 438 and 439 may include a badge reader, a radio frequency identification tag reader, a biometric device, a prompt requesting a password and/or user login, or any other type of identification mechanism. The biometric device may include, without limitation, a fingerprint scanner, a thumbprint scanner, a palm scanner, a voice print analysis tool, a retina scanner, an iris scanner, a device for reading deoxyribonucleic acid (DNA) patterns of the user, or any other type of biometric identification device.

Likewise, the identification of the user may include, without limitation, a user name, a password, a personal identification (PIN) number, an identifier, a fingerprint, a thumbprint, a retinal scan, an iris scan, or any other type of identification. The identification is associated with the set of preferences to map the set of preferences with the identification of the user that created the set of preferences. In another embodiment, security authentication, authorization, and/or identification information for the principal's identity may also be provided. The process of registering the principal with network based energy preference service 400 may also require the principal to provide one or more of these types of identification.

Network interface 440 is a device that permits electric vehicle 401 to establish a network connection. The network connection permits access to any type of network, such as a local area network (LAN), a wide area network (WAN), or the Internet. In this example, energy transaction planner 426 is located on electric vehicle 401. However, in another embodiment, energy transaction planner 426 may be located on any computing device that is remote from electric vehicle 401.

In this embodiment, energy transaction planner 426 is located on electric vehicle 401. In another embodiment, energy transaction planner 426 may be located on energy preference server 402 with network based energy preference service 400. Likewise, in this example, user 404 enters preferences 420 from remote client computer 406 located remotely from electric vehicle 401. However, in another embodiment, user 404 may access network based energy preference service 400 from an input/output device in electric vehicle 401. In such a case, user 404 is not required to have access to a client computer, such as remote client computer 406.

In this example, energy preference service 400 receives a request for preferences for a principal from energy transaction planner 426 via requester interface 424. However, network based energy preference service 400 may also receive a request for preferences through requester interface from an entity other than energy transaction planner 426. For example, network based energy preference service 400 may receive a request from another preference service on a different computing device, such as, without limitation, a proxy preference service on electric vehicle 401 (not shown) or a remote preference service located on a different remote computing device.

In this embodiment, requester interface 424 provides a software interface to permit energy transaction planner 426 or a different energy preference service to communicate with network based energy preference service and request preferences for a principal. However, in another embodiment, network based energy preference service 400 may contain a dedicated energy transaction planner interface for interfacing with energy transaction planner 426 and also contain one or more additional interfaces (not shown) for other requesting services such as, but not limited to, another remote preference service or an on-vehicle preference service acting as a proxy preference service.

Figure 5:
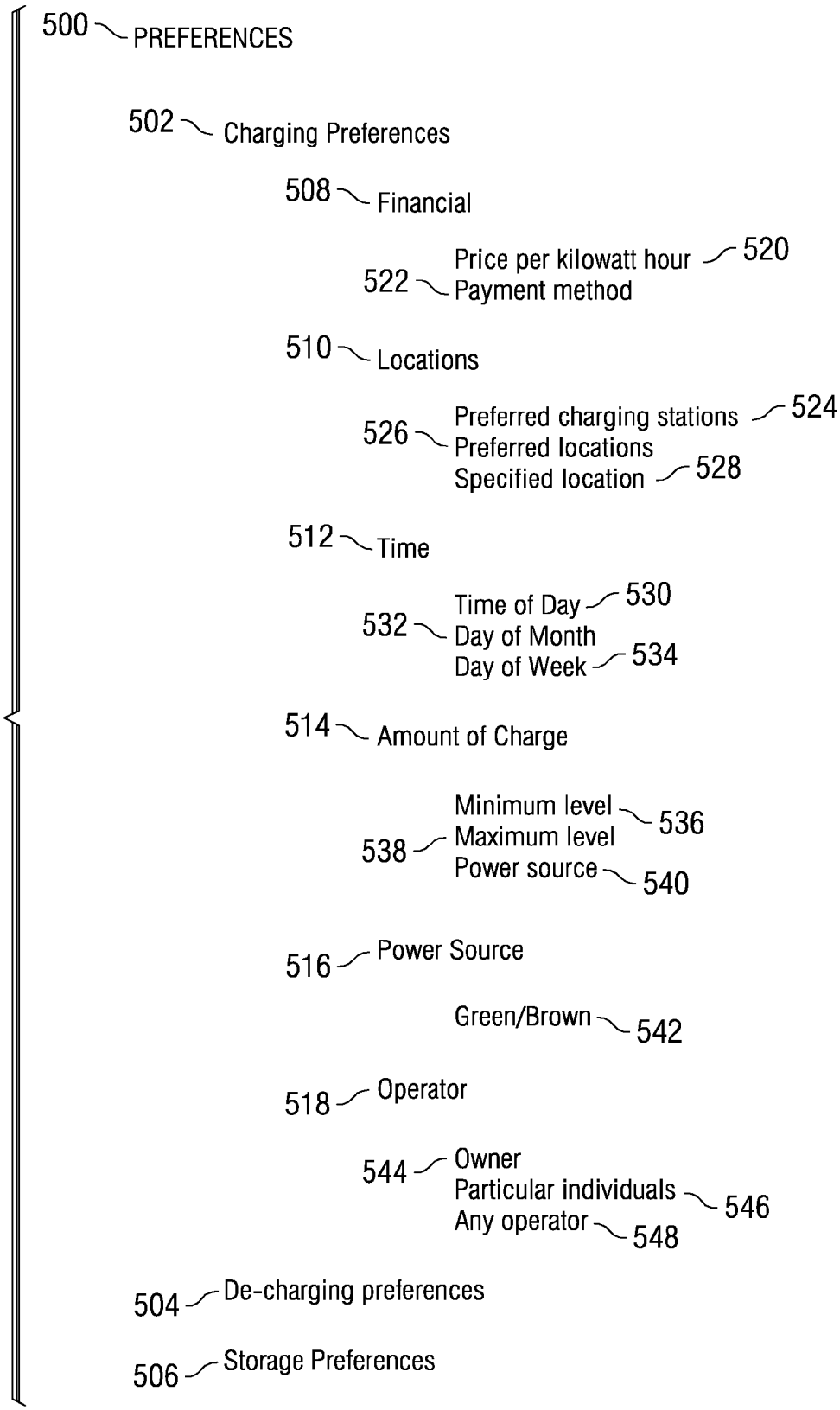
FIG. 5 is a block diagram of vehicle preferences in accordance with an illustrative embodiment.

Referring to FIG. 5, a block diagram of electric vehicle charging preferences is shown in accordance with an illustrative embodiment. Preferences 500 are types of preferences that may be included within preferences for one or more users, such as preferences 420 in FIG. 4. Preferences 500 may be charging preferences 502 for governing energy transaction to charge an energy storage device associated with the electric vehicle, de-charging preferences 504 for governing energy transactions for de-charging or depleting the energy stored in an energy storage device, or storage preferences 506 for governing the storage of electricity in the electric vehicle's energy storage mechanisms.

A user may wish to de-charge or transfer power from the electric vehicle to a charging station if the price of the electricity is higher than when the electricity was purchased and stored in the electric vehicle. For example, if a user charges an electric vehicle at night when the price of the electricity is only nine cents per kilowatt hour, the user may wish to de-charge or provide electricity from the electric vehicle back to the charging station at noon when the price per kilowatt hour is fifteen cents because the user is able to make a profit from storing the electricity in the electric vehicle until the price of electricity increases and then selling the electricity back to the electric grid.

Some examples of charging preferences include, without limitation, financial 508, locations 510, time 512, amount of charge 514, power source 516, and/or operator 518. For example, financial 508 preferences may specify price per kilowatt hour 520 that the user is willing to pay to charge the electric vehicle or payment method 522 for purchasing the electricity from the charging station and/or the electricity grid. Payment method 522 may include, without limitation, credit cards, cash, debit card, credit, or any other type of payment. The payment type preferences may even specify a particular credit card or bank account for debit to pay for the charging transaction.

Locations 510 preferences may specify preferred charging station 524, preferred locations 520 of the charging stations, and/or specified locations 528 for charging. For example, the user may specify that any time the electric vehicle is parked at a charging station that is at a specified location, the electric vehicle is not to be charged at all, to be charged to a particular charge level, or to be fully charged. The user may wish to set these preferences because the charging stations are a given distance from the user's home or workplace, due to past service received at the charging station, or any other factors.

Time 512 preferences may specify, without limitation, time of day 530 for charging the vehicle, time of day to stop charging the vehicle, day of month 532 for charging, and/or day of the week 534 for charging the electric vehicle.

Amount of charge 514 preferences may specify minimum level 536 of charge in the electric vehicle's storage device, a maximum level of charge 538, or specify different levels of charge depending on power source 540 of the electricity used to charge the electric vehicle. If the power source is a "green" source, such as solar power, the user may specify a higher charge level than if the power source is a more environmentally harmful, or "brown" power source, such as coal or oil.

Power source 516 preferences specify types of power sources that are acceptable or preferred and/or provide weighting values for different power sources. The power sources may be identified as "green" or "brown" 542. The power sources may also be identified specifically by the type of power source, such as wind, solar, coal, oil, and so forth.

Operator 518 preferences are preferences for allowing particular operators to charge the electric vehicle. Owner 544 is a preference that permits an owner to charge, particular individuals 546 permits identified individuals to charge the vehicle, and any operator 548 is a preference that permits anyone to charge the electric vehicle. The operator 518 preference may permit a user to prevent or impede theft of the electric vehicle. For example, if a user sets owner 544 as a mandatory preference that only permits the owner to charge the electric vehicle, a thief would not be permitted to recharge the electric vehicle. Therefore, a thief may not be able to transport the electric vehicle very far from the location at which the electric vehicle was stolen.

The preferences described for charging preferences 502 are only example of some preferences that may be used. A network based energy preference service is not required to utilize all of the preferences shown in FIG. 5. Moreover, a network based energy preference service may utilize other preferences not shown in FIG. 5 without departing from the scope of the embodiments. Finally, the preferences shown for charging preferences 502 may also be used as preferences for de-charging preferences 504 and/or storage preferences 506, in addition to other preferences not shown. For example, de-charging preferences 504 may include operator 518 preferences specifying operators that are permitted to de-charge or sell power back to the electric grid, financial 508 specifying prices at which the electricity may be transferred from the electric vehicle and sold back to the electric grid, time 512 when de-charging may occur, amount of charge 514 levels for de-charging, and power source 516 of the power that is de-charged.

Figure 6:
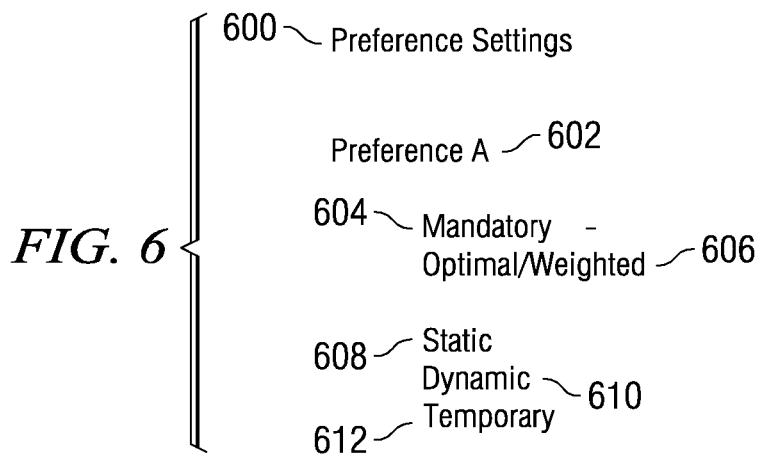
FIG. 6 is a block diagram of preference settings in accordance with an illustrative embodiment.

FIG. 6 is a block diagram of preference settings in accordance with an illustrative embodiment. Preference settings 600 are settings that may be appended to a preference, such as preference A 602. Preference A 602 may be any type of preference, such as, without limitation, financial, locations, time, amount of charge, power source, operator, or any other preferences. Mandatory 604 specifies that the requirements of a particular preference must be met or a charging transaction will not be permitted. For example, if a user sets an operator preference indicating that only the owner is permitted to charge the electric vehicle and the user sets the preference to mandatory, only the owner will be permitted to initiate charging of the electric vehicle. Any other operator of the electric vehicle will not be permitted to charge the electric vehicle unless the owner changes the preference settings.

Optional/weighted 606 is a setting that indicates that a preference is preferred or desirable, but not mandatory. For example, the user may specify that "green" power sources, such as wind and solar power sources, are preferred but not mandatory. In such cases, the energy transaction planner may still permit charging of the electric vehicle at charging stations that utilize electricity provided by coal powered electric generators. The weighting value permits a user to indicate how strongly the user wants a particular preference to be minimized, maximized, or optimized. In the example above, the user may indicate a high weighting value in favor of wind and solar power, a medium weighting value for nuclear power plants, and a low weighting value for coal power plants. The energy transaction planner may then use the weighting to determine how much to charge or de-charge the electric vehicle or whether to charge or de-charge the electric vehicle at all.

Static 608 indicates that a preference is a default preference that should be used in all cases. A static preference does not change from one charging transaction to the next charging transaction. Dynamic 610 is a setting that indicates that a user wants to provide or select a value or choice for this preference every time a charging transaction plan is generated. A dynamic preference is selected in real time as the charging transaction is commencing. Temporary 612 indicates that a temporary preference value is to be used in place of a static preference for a limited period of time. For example, a user may wish to override a static preference that the electric vehicle should always be fully charged at a particular charging station with a temporary preference indicating that the electric vehicle is not to be charged because the user will only be parked at the charging station for a few minutes.

Figure 7:
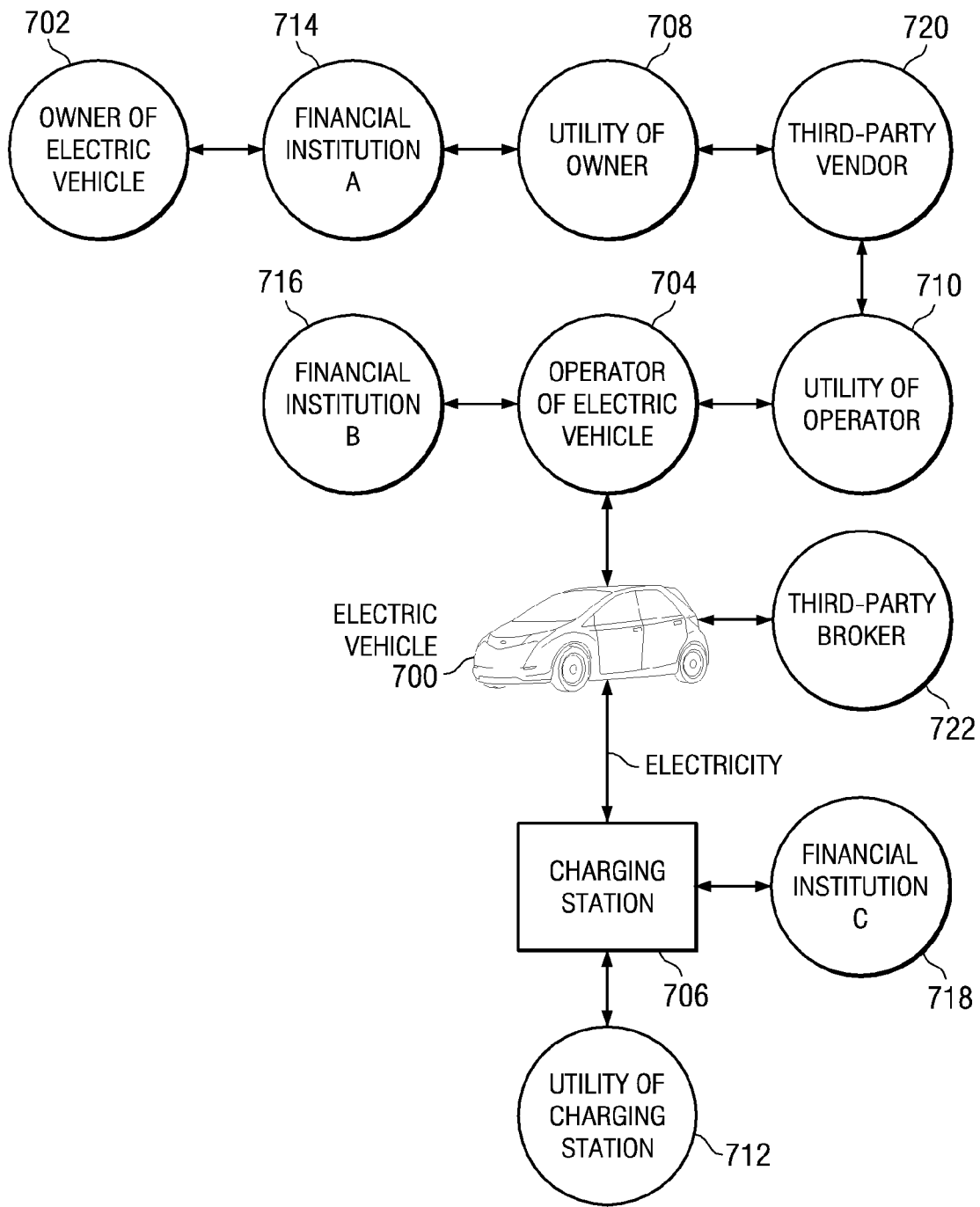
FIG. 7 is a block diagram of parties to an electric vehicle charging transaction in accordance with an illustrative embodiment.

Turning now to FIG. 7, a block diagram of parties to an electric vehicle charging transaction is depicted in accordance with an illustrative embodiment. Each party may have a set of preferences for charging the electric vehicle that is managed by the network based energy preference service. A principal is any entity that may have an interest or role in the energy transaction for charging an electric vehicle, including but not limited to, the vehicle operator, owner of the electric vehicle, the owner of the charging station, the operator of the charging station, financial institutions associated with one or more of the parties, utilities associated with one or more of the principals, or third parties having an interest in the charging transaction. FIG. 7 illustrates the different relationships between principals. Any one or more of the principals shown in FIG. 7 may have preferences stored in the on network based energy preference service.

Electric vehicle 700 is a vehicle that relies in whole or in part on electric power to drive the vehicle, such as electric vehicle 116 in FIG. 1 or electric vehicle 400 in FIG. 4. Owner of electric vehicle 702 is a principal that creates a set of preferences in network based energy preference service on electric vehicle 700. Operator of electric vehicle 704 is a principal that may be the owner or only someone that has borrowed electric vehicle 700. Each operator may optionally create their own set of preferences in the network based energy preference service on electric vehicle. Charging station 706 is a station or kiosk at which electric vehicle obtains charge or de-charges to provide electricity back to the electric grid, such as charging station 118 in FIG. 1 or charging station 434 in FIG. 4. Charging station 706 may also have a set of preferences for governing the charging of electric vehicle 700.

Each party may have a utility associated with the party. A utility refers to a provider of electric power. A utility typically provides electric power to a charging station via an electric power grid. Each utility may also have preferences for governing the charging transaction. For example, utility of owner 708, utility of operator 710, and utility of charging station 712 may each be parties with an interest in the charging transaction and preferences for governing the charging of electric vehicle 700.

Each party may also have a financial institution for paying for the electricity purchased, or for being reimbursed for electricity provided back to the electric grid. A financial institution may be a bank, a credit card company, a broker, a lender, or any other financial institution. For example, financial institution A 714 may be associated with owner of electric vehicle 702, financial institution B 716 may be associated with operator of electric vehicle 704, and financial institution C 718 may be associated with charging station 706. Each of these financial institutions may have preferences for controlling how amounts due are received, how charges of payments are received and accepted, how credits are issued and received, and other aspects of financial transactions associated with charging electric vehicle 700.

Third party vendor 720 is a third party that is not associated with charging station 706 or electric vehicle 700. For example, and without limitation, third party vendor 720 may be a grocery store, a convenience store, a car wash, a repair shop, or any other type of vendor. Third party broker 722 is a third party that may provide financing or manage financial transactions associated with charging electric vehicle 700.

Each of the parties shown in FIG. 7 may optionally have preferences, constraints, limitations, or requirements associated with charging electric vehicle 700. The network based energy preference service 700 may optionally store, manage, and retrieve some or all of these preferences, constraints, limitations, and requirements in data storage device on electric vehicle 700. The network based energy preference service retrieves the information of interest that is responsive to a request by an energy transaction planner and sends the preferences of interest to the energy transaction planner for use in generating a plan to govern the charging of electric vehicle 700 at charging station 706.

Figure 8:
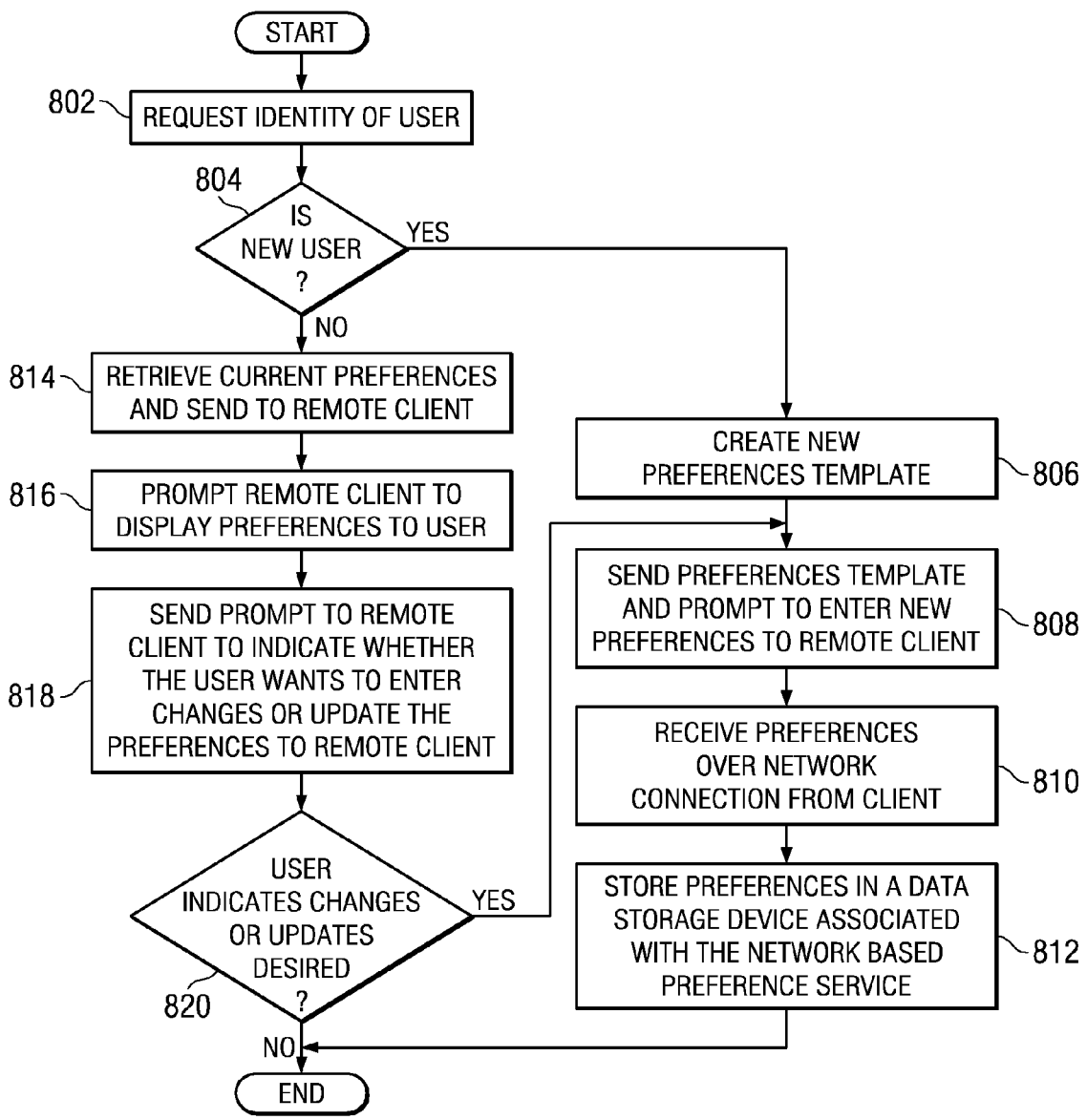
FIG. 8 is a flowchart illustrating a process for creating and maintaining preferences for an identified principal by a network based energy preference service in accordance with an illustrative embodiment.

FIG. 8 is a flowchart illustrating a process for creating and storing preferences by a network based energy preference service in accordance with an illustrative embodiment. The process in FIG. 8 is implemented by an energy preference service located off the electric vehicle, such as network based energy preference service 400 in FIG. 4.

The process begins by requesting an identity of a user (step 802). The user may be identified using any type of identification means, such as, without limitation, a user name, a password, a personal identification (PIN) number, an identifier, a fingerprint, a thumbprint, a retinal scan, an iris scan, or any other type of identification. The user may be an owner of an electric vehicle, an operator of the electric vehicle, a utility, a financial institution, an owner or operator of a charging station, a third party broker, or any other principal shown in FIG. 7.

The network based energy preference service makes a determination as to whether the user is a new user (step 804). If the user is a new user, the network based energy preference service creates a new preferences template (step 806). The network based energy preference service sends the preferences template to the remote client and sends a prompt to the user at the remote client to enter new preferences (step 808). The network based energy preference service is located on a remote computing device from the client computing device at which the user is creating the preferences. Therefore, the network based energy preference service sends a message or data packet to cause the client computing device to prompt the user to enter the new preferences. The user may enter the preference selections through a user interface located on the remote client computing device, such as user input/output 412 in FIG. 4. The preferences are received by the network based energy preference service and stored in a local data storage device that is accessible to the network based energy preference service.

The network based energy preference service receives the preferences from the remote client over the network connection (step 810). The network based energy preference service stores the preferences in a data storage device associated with the network based energy preference service (step 812) with the process terminating thereafter.

Returning to step 804, if the user is not a new user, the network based energy preference service retrieves current preferences for the user who is not a new user and sends the current preferences to the remote client (step 814). The network based energy preference service prompts the remote client computing device to display the current preferences to the user (step 816). The user is queried by the remote client computing device as to whether the user wants to enter changes or update the preferences. The network based energy preference service sends a prompt to the remote client to indicate whether the user wants to enter changes or update the preferences (step 818).

The network based energy preference service makes a determination as to whether the user indicates that changes or updates to the current preferences are desired (step 820). If changes or updates are not desired, the process terminates thereafter. If the user indicates that changes or updates are desired at step 820, the network based energy preference service sends a preferences template and a prompt to enter new preferences to the remote client (step 808). The network based energy preference service receives the preferences from the remote client over the network connection (step 810). The network based energy preference service store the preferences in a data storage device associated with the network based energy preference service (step 812) to form updated preferences for the user with the process terminating thereafter.

This process in FIG. 8 permits a user to input their preferences directly into a remote client computing device. The client computing device may have a more complex and/or user friendly input/output device to permit a user to select preferences. The set of preferences selected by the user are then transmitted over a network to the remote network based energy preference service. This process also permits a user to store preferences for one or more other principals on the network based energy preference service. For example, if the user is the owner of the electric vehicle, the user may wish to enter the user's own preferences and the preferences for the user's utility company and one or more frequent operators of the electric vehicle from the client device and transmit the selections to the network based energy preference service.

Figure 9:
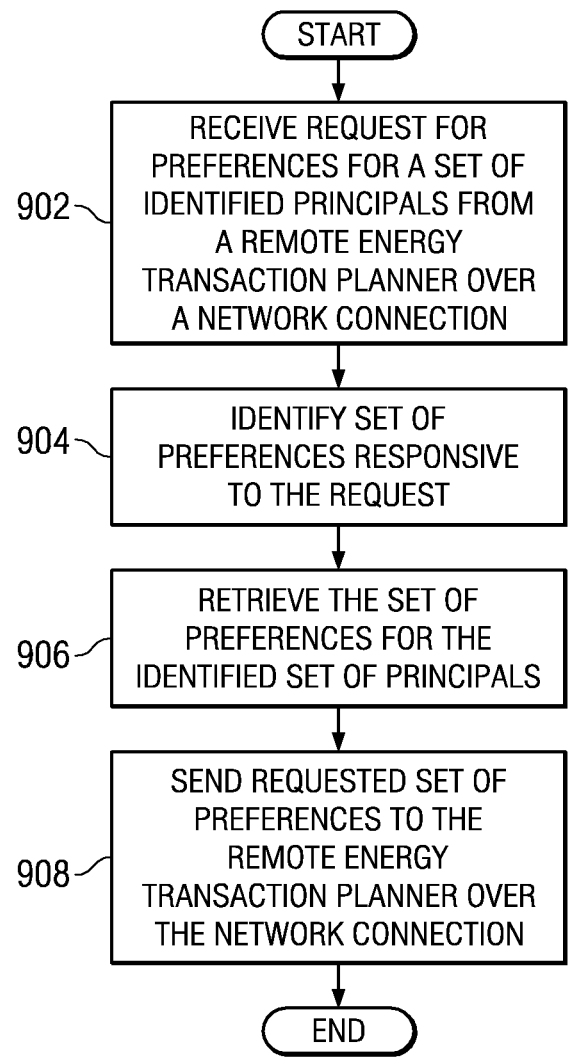
FIG. 9 is a flowchart illustrating a process for retrieving preferences of interest in response to a request from an authorized requesting service in accordance with an illustrative embodiment.

Turning now to FIG. 9, a flowchart illustrating a process for retrieving preferences in response to a request from an authorized requesting service is depicted in accordance with an illustrative embodiment. The authorized requesting service may be an energy transaction planner, a proxy preference service, or any other authorized requesting service. The process in FIG. 9 may be implemented by software for creating, storing, maintaining, and retrieving electric vehicle charging preferences, such as network based energy preference service 400 in FIG. 4.

The process begins by receiving a request for preferences for a set of one or more identified principals from a remote energy transaction planner over a network connection (step 902). The remote energy transaction planner may be located on the electric vehicle or on a different computing device that is remote from the energy preference server hosting the network based energy preference service. The network based energy preference service identifies the set of preferences responsive to the request (step 904). The network based energy preference service retrieves the set of preferences for the set of identified principals (step 906). The network based energy preference service sends the requested set of preferences to the remote energy transaction planner over the network connection (step 908) with the process terminating thereafter.

In the example in FIG. 9 the requesting service is an energy transaction planner. The description of the process in FIG. 9 using the energy transaction planner is illustrative and not limiting. The requesting entity may also include, without limitation, a proxy preference service, a vehicle preference service on-board an electric vehicle, or any other authorized requesting entity.

Figure 10:
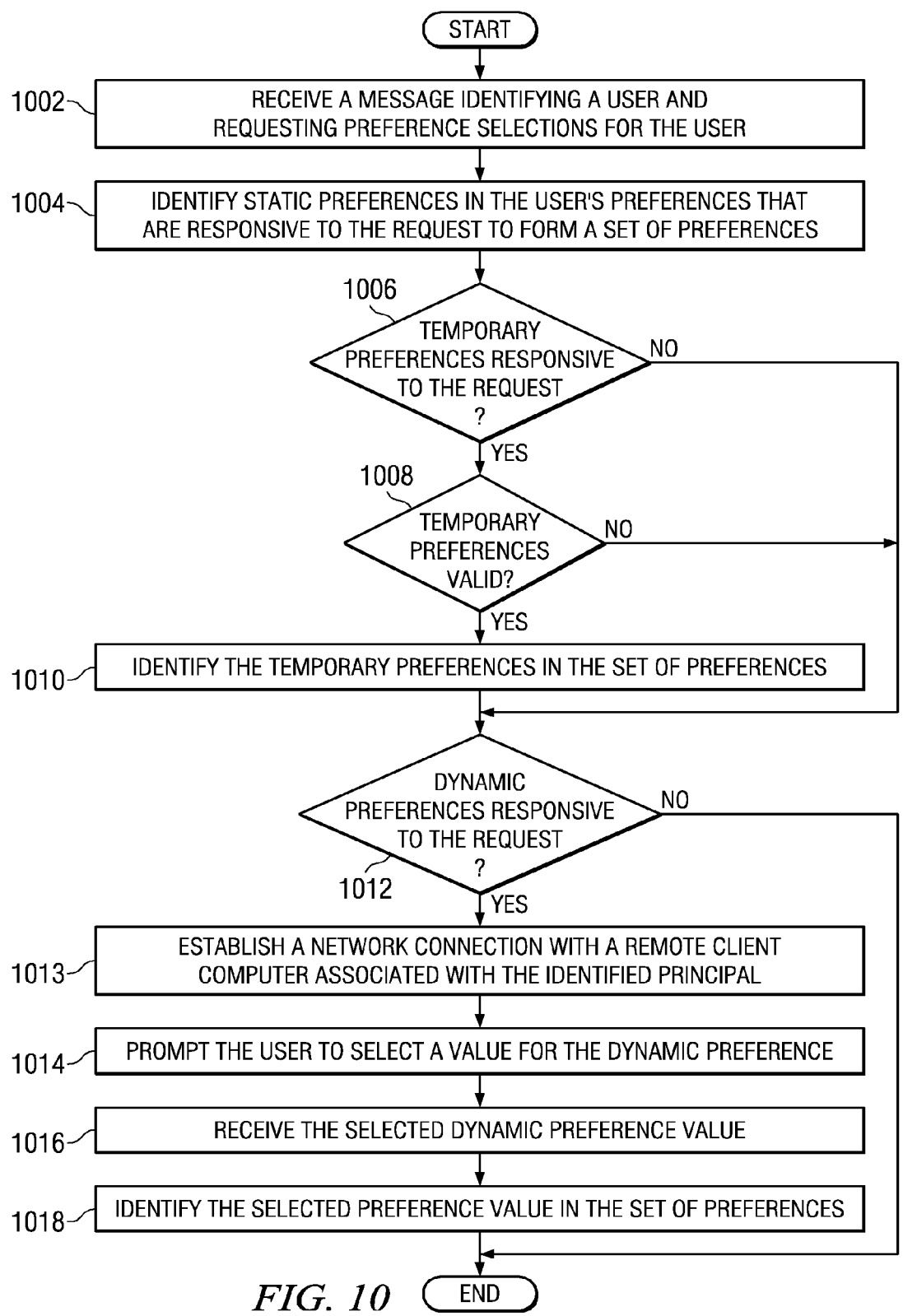
FIG. 10 is a flowchart illustrating a process for identifying a set of preferences for an identified principal by a network based preference service in accordance with an illustrative embodiment.

FIG. 10 is a flowchart illustrating a process for identifying a set of preferences for an identified principal by a network based preference service in accordance with an illustrative embodiment. The process in FIG. 10 may be implemented by software for creating, storing, and maintaining electric vehicle charging preferences network based energy preference service 400 in FIG. 4.

The process begins by receiving a message from a remote energy transaction planner identifying a user and requesting preference selections for the user (step 1002). The message is received over a network connection. The network based energy preference service identifies static preferences in the user's preferences that are responsive to the request, such as static preference 608 in FIG. 6, to form a set of preferences (step 1004). A preference that is responsive to a request is a preference that is a type of preference of interest to the transaction. For example, an energy transaction planner may be concerned with identifying how long to charge an electric vehicle. In such a case, the types of preferences of interest that are responsive to the request may include amount of charge 514 and time 512 in FIG. 5 while preferences associated with de-charging and storage preferences may not be responsive to the request.

The network based energy preference service makes a determination as to whether any temporary preferences, such as temporary preferences 612 in FIG. 6, are responsive to the request (step 1006). If any temporary preferences are responsive to the request, the network based energy preference service makes a determination as to whether the temporary preferences are valid (step 1008). A temporary preference may be invalid if the time period during which the temporary preference is valid is expired. If the temporary preference is valid at step 1008, the network based energy preference service identifies the temporary preferences in the set of preferences (step 1010). In other words, the valid temporary preferences that are responsive to the request are included in the set of preferences along with the static preferences.

The network based energy preference service determines whether any dynamic preferences are responsive to the request (step 1012). If none of the dynamic preferences are responsive to the request, the process terminates thereafter. If one or more of the dynamic preferences for the user is responsive to the request, the network based energy preference service establishes a network connection with a remote client computing device associated with the identified principal (step 1013). The remote client computing device may be any type of computing device, such as, without limitation, a desktop computer, a laptop computer, a personal digital assistant (PDA), a cellular telephone, or any other computing device.

The network based energy preference service prompts the user to select a value for the dynamic preference (step 1014). A value for a dynamic preference is a selected setting or choice for the dynamic preference. The network based energy preference service receives the selected value for the dynamic preference from the user (step 1016). The network based energy preference service identifies the selected dynamic preference value in the set of preferences (step 1018). In other words, the selected dynamic preference is included in the set of preferences for the user, in addition to the static preferences and any temporary preferences responsive to the request, with the process terminating thereafter.

Figure 11:
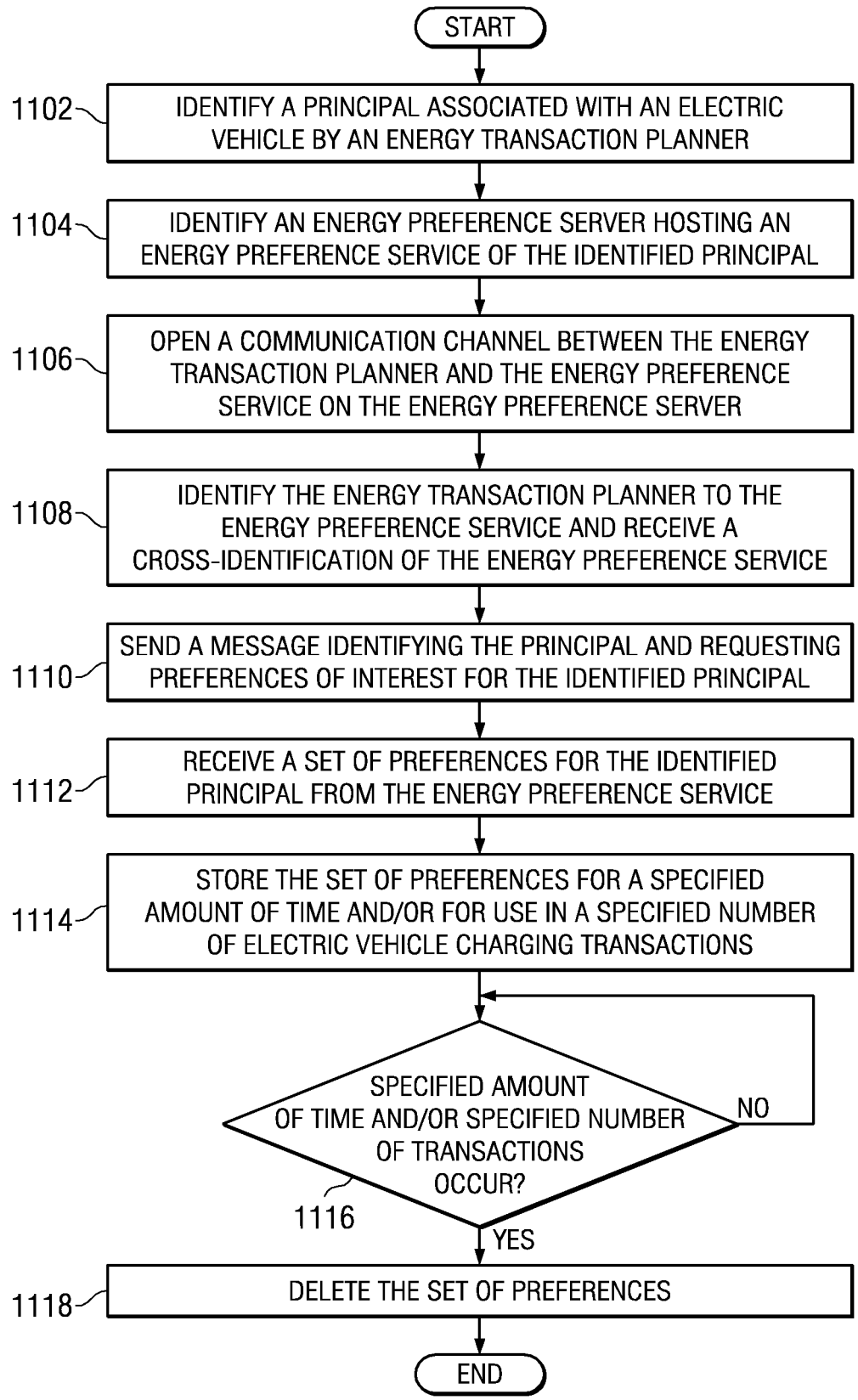
FIG. 11 is a flowchart illustrating a process for requesting preferences of interest to an electric vehicle charging transaction from a network based energy preference service in accordance with an illustrative embodiment.

Referring now to FIG. 11, a flowchart illustrating a process for requesting preferences of interest to an electric vehicle charging transaction from a network based energy preference service is shown in accordance with an illustrative embodiment. The process in FIG. 11 may be implemented by software for generating an energy transaction plan, such as energy transaction planner 310 in FIG. 3 and/or 426 in FIG. 4.

The process begins by identifying a principal associated with an electric vehicle by an energy transaction planner (step 1102). The energy transaction planner identifies an energy preference server hosting a network based energy preference service of the identified principal (step 1104). The energy transaction planner opens a communication channel between the energy transaction planner and the energy preference service on the energy preference server (step 1106). The energy transaction planner identifies itself to the energy preference service and receives a cross-identification of the energy preference service from the energy preference server (step 1108). The energy transaction planner sends a message identifying the principal and requesting preferences of interest from the preferences for the identified principal (step 1110). The energy transaction planner receives a set of preferences for the identified principal from the energy preference service that is responsive to the request (step 1112). The energy transaction planner stores the set of preferences for a specified amount of time and/or for use in a specified number of electric vehicle charging transactions (step 1114).

The energy transaction planner makes a determination as to whether a predetermined condition has occurred (step 1116). When the predetermined condition has occurred, the energy transaction planner deletes the set of preferences (step 1118) with the process terminating thereafter. The predetermined condition is a set of one or more rules for determining when to delete temporarily stored preferences. The predetermined condition may include, without limitation, a given number of charging transactions, a predetermined period of time, disconnection of a battery, a user selection to delete the preferences, or any other condition.

The network based preference service provides a remote preference service for inputting, storing, maintaining, and retrieving electric vehicle charging preferences. The network based energy preference service allows for complex input processes on a remote computing device to permit a principal to create and/or update electric vehicle charging preferences. The network based energy preference service also permits relatively simple input processes on the electric vehicle for identifying a principal and retrieving preferences of interest for the identified principal. In this manner, the electric vehicle charging preferences may be maintained by a remote service located off the electric vehicle until the preferences of interest for a particular charging transaction are needed by an energy transaction planner associated with the electric vehicle. The network based energy transaction planner makes it unnecessary to install or add-on an energy preference service either on the electric vehicle or on a computing device owned by the principal. Instead, the electric vehicle and/or the computing device owned by the principal simply connects to the remote network based energy preference service via a network connection to create preferences, update preferences, and/or obtain a desired set of preferences for a particular charging transaction using the network based energy preference service.

According to one embodiment of the present invention, a computer implemented method, apparatus, and computer usable program product is provided for managing network based preferences associated with charging transactions for electric vehicles. A network based energy preference service receives an identification of a principal associated with a first computing device using a network connection between the first computing device and an energy preference server associated with the network based energy preference service. A principal is an entity having an interest in an electric vehicle charging transaction. The charging transaction is a transaction associated with at least one of charging an electric vehicle, storing electric power in an electric storage mechanism associated with the electric vehicle, and de-charging the electric vehicle. Network based energy preference service receives an identification of the principal associated with the first computing device by the network based energy preference service. Network based energy preference service receives preferences from the principal associated with the first computing device over the network connection. In response to receiving a request for a set of preferences for the electric vehicle charging transaction from an energy transaction planner. The network based energy preference service retrieves the set of preferences responsive to the request. The network based energy preference service sends the set of preferences to the energy transaction planner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing network based preferences associated with charging transactions for electric vehicles, the computer implemented method comprising:
    receiving an identification of a principal associated with a first computing device by a network based energy preference service using a network connection between the first computing device and an energy preference server associated with the network based energy preference service, wherein the principal is an entity having an interest in a charging transaction for an electric vehicle and belongs to a set of principals comprising a user of the vehicle, an electric utility of the owner, an electric utility of an operator, a charging station, an electric vehicle manufacturer, an electric vehicle distributor, and the electric vehicle, wherein the charging transaction is a transaction associated with at least one of charging the electric vehicle, storing electric power in the electric storage mechanism associated with the electric vehicle, and de-charging the electric vehicle, and wherein the energy preference service is a software component that generates, stores, and retrieves preferences associated with the electric vehicle and each principal in the set of principals;
    receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server;

responsive to receiving a request for a subset of preferences selected from a group comprising a temporary preference, a dynamic preference, a mandatory preference and an optional preference and wherein each preference is prioritized relative to other preferences in the subset of preferences in the set of preferences for the principal from a preference requesting service, sending the subset of preferences for the principal to the preference requesting service to use for generating an energy transaction plan using an energy transaction planner, wherein the energy transaction plan manages the charging of the electric vehicle, de-charging of the electric vehicle, and storing electric power in the electric vehicle in accordance with the subset of preferences and is generated in real time prior to starting the charging, de-charging, and storing operations of the transaction, and wherein sending the subset of preferences further comprises:

responsive to identifying a temporary preference in the subset of preferences, determining whether the temporary preference is valid, wherein the temporary preference is a preference that is only valid for a predetermined period of time or a predetermined number of charging transactions; and responsive to a determination that the temporary preference is valid, including the temporary preference in the subset of preferences that is sent to the energy transaction planner in response to the request.

2. The computer implemented method of claim 1 wherein the preference requesting service is associated with an energy transaction planner that is located on a remote computing device, wherein the remote computing device is remote to the energy preference server and remote to the first computing device.

3. The computer implemented method of claim 1 wherein the preference requesting service is a proxy preference service that is located on the electric vehicle.

4. A computer implemented method of managing network based preferences associated with charging transactions for electric vehicles, the computer implemented method comprising:

receiving an identification of a principal associated with a first computing device by a network based energy preference service using a network connection between the first computing device and an energy preference server associated with the network based energy preference service, wherein the principal is an entity having an interest in a charging transaction for an electric vehicle, and wherein the charging transaction is a transaction associated with at least one of charging the electric vehicle, storing electric power in the electric storage mechanism associated with the electric vehicle, and de-charging the electric vehicle;

receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server;

responsive to receiving a request for a subset of preferences from the set of preferences for the principal from a preference requesting service, sending the subset of preferences for the principal to the preference requesting service;

wherein each preference in the set of preferences is associated with a weighting value, wherein sending the subset of preferences further comprises sending the weighting value associated with the each preference in the subset of preferences to an energy transaction planner, and wherein the weighting value indicates a priority of each preference in the subset of preferences relative to other preferences in the subset of preferences, and wherein sending the subset of preferences further comprises:

responsive to identifying a dynamic preference in the subset of preferences, prompting the principal to select a preference value for the dynamic preference, wherein the dynamic preference is a preference that requires a selection of a preference value by the principal in real time;

receiving a selection of the preference value for the dynamic preference; and including the dynamic preference and the value selected for the dynamic preference in the subset of preferences that is sent to the energy transaction planner in response to the request.

5. The computer implemented method of claim 1 wherein the energy preference server is an application server hosting a preference selection website, and wherein the principal logs onto the preference selection website from the first computing device to select preferences to form the set of preferences, and further comprising:

registering the principal by the network based energy preference service.

6. A computer implemented method of managing network based preferences associated with charging transactions for electric vehicles, the computer implemented method comprising:

receiving an identification of a principal associated with a first computing device by a network based energy preference service using a network connection between the first computing device and an energy preference server associated with the network based energy preference service, wherein the principal is an entity having an interest in a charging transaction for an electric vehicle, and wherein the charging transaction is a transaction associated with at least one of charging the electric vehicle, storing electric power in the electric storage mechanism associated with the electric vehicle, and de-charging the electric vehicle;

receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and responsive to receiving a request for a subset of preferences from the set of preferences for the principal from a preference requesting service, sending the subset of preferences for the principal to the preference requesting service;

responsive to a determination that the principal has previously selected preferences to form current preferences, retrieving the current preferences for the principal and presenting the preferences to the principal;

responsive to receiving a selection to enter changes to the preferences by the principal, prompting the principal to enter the changes to the current preferences;
receiving the changes to the preferences; and
storing the changes to the preferences in the data storage device to form updated preferences for the principal.

7. A computer implemented method of managing network based preferences associated with charging transactions for electric vehicles, the computer implemented method comprising:
receiving an identification of a principal associated with a first computing device by a network based energy preference service using a network connection between the first computing device and an energy preference server associated with the network based energy preference service, wherein the principal is an entity having an interest in a charging transaction for an electric vehicle, and wherein the charging transaction is a transaction associated with at least one of charging the electric vehicle, storing electric power in the electric storage mechanism associated with the electric vehicle, and de-charging the electric vehicle;
receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and
responsive to receiving a request for a subset of preferences from the set of preferences for the principal from a preference requesting service, sending the subset of preferences for the principal to the preference requesting service;
wherein sending the subset of preferences further comprises:
responsive to identifying a temporary preference in the subset of preferences, determining whether the temporary preference is valid, wherein the temporary preference is a preference that is only valid for a predetermined period of time or a predetermined number of charging transactions; and
responsive to a determination that the temporary preference is valid, including the temporary preference in the subset of preferences that is sent to an energy transaction planner in response to the request.

8. A computer implemented method of managing network based preferences associated with charging transactions for electric vehicles, the computer implemented method comprising:
receiving an identification of a principal associated with a first computing device by a network based energy preference service using a network connection between the first computing device and an energy preference server associated with the network based energy preference service, wherein the principal is an entity having an interest in a charging transaction for an electric vehicle, and wherein the charging transaction is a transaction associated with at least one of charging the electric vehicle, storing electric power in the electric storage mechanism associated with the electric vehicle, and de-charging the electric vehicle;
receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and
responsive to receiving a request for a subset of preferences from the set of preferences for the principal from a preference requesting service, sending the subset of preferences for the principal to the preference requesting service;
wherein sending the subset of preferences further comprises:
responsive to identifying a dynamic preference in the subset of preferences, prompting the principal to select a preference value for the dynamic preference, wherein the dynamic preference is a preference that requires a selection of a preference value by the principal in real time;
receiving a selection of the preference value for the dynamic preference; and
including the dynamic preference and the value selected for the dynamic preference in the subset of preferences that is sent to an energy transaction planner in response to the request.

9. A computer implemented method of managing network based preferences associated with charging transactions for electric vehicles, the computer implemented method comprising:
receiving an identification of a principal associated with a first computing device by a network based energy preference service using a network connection between the first computing device and an energy preference server associated with the network based energy preference service, wherein the principal is an entity having an interest in a charging transaction for an electric vehicle, and wherein the charging transaction is a transaction associated with at least one of charging the electric vehicle, storing electric power in the electric storage mechanism associated with the electric vehicle, and de-charging the electric vehicle;
receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and
responsive to receiving a request for a subset of preferences from the set of preferences for the principal from a preference requesting service, sending the subset of preferences for the principal to the preference requesting service;
wherein each preference in the subset of preferences is associated with an indicator that indicates whether the preference is mandatory or optional, wherein all requirements of a mandatory preference are met during the charging transaction, and wherein the charging transaction is terminated in response to a determination that a mandatory preference is not met.

10. The computer implemented method of claim 1 wherein the principal is selected from a group consisting of an operator of the electric vehicle, an owner of the electric vehicle, an owner of a charging station, an operator of the charging station, an electric power provider of the owner of the electric vehicle, an electric power provider of the operator of the electric vehicle, an electric power provider of the owner of the charging station, a financial institution, and a third party broker.

11. The computer implemented method of claim 1 wherein the energy preference service is accessed by the principal using a website, and wherein the website is a personal website of the principal, and wherein the energy preference server is a web server.

12. A computer program product comprising:
a computer recordable non-transitory storage medium including computer readable program code for managing network based preferences associated with charging transactions for electric vehicles, said computer program product comprising:
computer readable program code for receiving an identification of a principal associated with a first computing device by a network based energy preference service using a network connection between the first computing device and an energy preference server associated with the network based energy preference service, wherein the principal is an entity having an interest in a charging transaction for an electric vehicle and belongs to a set of principals comprising a user of the vehicle, an electric utility of the owner, an electric utility of an operator, a charging station, an electric vehicle manufacturer, an electric vehicle distributor, and the electric vehicle, wherein the charging transaction is a transaction associated with at least one of charging the electric vehicle, storing electric power in the electric storage mechanism associated with the electric vehicle, and de-charging the electric vehicle, and wherein the energy preference service is a software component that generates, stores, and retrieves preferences associated with the electric vehicle and each principal in the set of principals;
computer readable program code for receiving a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and
computer readable program code for sending a selected subset of the preferences from a group comprising a temporary preference, a dynamic preference, a mandatory preference and an optional preference and wherein each preference is prioritized relative to other preferences in the subset of preferences in the set of preferences for the principal to a preference requesting service in response to receiving a request for the subset of preferences for the principal from the preference requesting service to use for generating an energy transaction plan using an energy transaction planner, wherein the energy transaction plan manages the charging of the electric vehicle, de-charging of the electric vehicle, and storing electric power in the electric vehicle in accordance with the subset of preferences and is generated in real time prior to starting the charging, de-charging, and storing operations of the transaction, and wherein sending the subset of preferences further comprises:
responsive to identifying a temporary preference in the subset of preferences, determining whether the temporary preference is valid, wherein the temporary preference is a preference that is only valid for a predetermined period of time or a predetermined number of charging transactions; and
responsive to a determination that the temporary preference is valid, including the temporary preference in the subset of preferences that is sent to the energy transaction planner in response to the request.

13. The computer program product of claim 12 wherein the preference requesting service is associated with an energy transaction planner that is located on a remote computing device, wherein the remote computing device is located remotely from the energy preference server and the first computing device.

14. The computer program product of claim 12 wherein the preference requesting service is a proxy preference service that is located on the electric vehicle.

15. An apparatus comprising:
a bus system;
a communications system coupled to the bus system;
a memory connected to the bus system, wherein the memory includes computer readable program code; and
a processing unit coupled to the bus system, wherein the processing unit executes the computer readable program code to receive an identification of a principal associated with a first computing device by a network based energy preference service using a network connection between the first computing device and an energy preference server associated with the network based energy preference service, wherein the principal is an entity having an interest in a charging transaction for an electric vehicle and belongs to a set of principals comprising a user of the vehicle, an electric utility of the owner, an electric utility of an operator, a charging station, an electric vehicle manufacturer, an electric vehicle distributor, and the electric vehicle, wherein the charging transaction is a transaction associated with at least one of charging the electric vehicle, storing electric power in the electric storage mechanism associated with the electric vehicle, and de-charging the electric vehicle, and wherein the energy preference service is a software component that generates, stores, and retrieves preferences associated with the electric vehicle and each principal in the set of principals; receive a selection of preferences for the principal from the first computing device over the network connection to form a set of preferences for the principal, wherein a preference in the set of preferences specifies a parameter of the charging transaction that is to be minimized, maximized, or optimized, and wherein the preferences are stored in a data storage device associated with the energy preference server; and in response to receiving a request for a subset of preferences from a group comprising a temporary preference, a dynamic preference, a mandatory preference and an optional preference and wherein each preference is prioritized relative to other preferences in the subset of preferences in the set of preferences for the principal from a preference requesting service; sending the selected subset of preferences for the principal to the preference requesting service to use for generating an energy transaction plan using an energy transaction planner, wherein the energy transaction plan manages the charging of the electric vehicle, de-charging of the electric vehicle, and storing electric power in the electric vehicle in accordance with the subset of preferences and is generated in real time prior to starting the charging, de-charging, and storing operations of the transaction, and wherein sending the subset of preferences further comprises:
responsive to identifying a temporary preference in the subset of preferences, determining whether the temporary preference is valid, wherein the temporary preference is a preference that is only valid for a predetermined period of time or a predetermined number of charging transactions; and responsive to a determination that the temporary preference is valid, including the temporary preference in the subset of preferences that is sent to the energy transaction planner in response to the request.

16. The apparatus of claim 15 wherein the preference requesting service is associated with an energy transaction planner that is located on a remote computing device, wherein the remote computing device is located remotely from the energy preference server and the first computing device.

17. The apparatus of claim 15 wherein the preference requesting service is a proxy preference service that is located on the electric vehicle.

* * * * *